United States Patent
Xiao et al.

(10) Patent No.: US 10,973,049 B2
(45) Date of Patent: Apr. 6, 2021

(54) METHOD FOR EXECUTION OF RANDOM ACCESS, USER EQUIPMENT, AND BASE STATION

(71) Applicants: Sharp Kabushiki Kaisha, Sakai (JP); FG Innovation Company Limited, Hongkong (CN)

(72) Inventors: Fangying Xiao, Pudong Shanghai (CN); Shohei Yamada, Sakai (JP); Ningjuan Chang, Pudong Shanghai (CN); Renmao Liu, Pudong Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/324,545

(22) PCT Filed: Aug. 11, 2017

(86) PCT No.: PCT/CN2017/097129
§ 371 (c)(1),
(2) Date: Feb. 8, 2019

(87) PCT Pub. No.: WO2018/028683
PCT Pub. Date: Feb. 15, 2018

(65) Prior Publication Data
US 2019/0223212 A1     Jul. 18, 2019

(30) Foreign Application Priority Data
Aug. 12, 2016 (CN) .......................... 201610664211.4

(51) Int. Cl.
*H04W 74/00* (2009.01)
*H04W 74/02* (2009.01)
*H04W 74/08* (2009.01)

(52) U.S. Cl.
CPC ....... *H04W 74/008* (2013.01); *H04W 74/006* (2013.01); *H04W 74/02* (2013.01); *H04W 74/08* (2013.01); *H04W 74/0833* (2013.01)

(58) Field of Classification Search
CPC . H04W 74/008; H04W 74/006; H04W 74/02; H04W 74/08; H04W 74/0833
See application file for complete search history.

(56) References Cited

U.S. PATENT DOCUMENTS

| | | | |
|---|---|---|---|
| 2017/0238284 A1* | 8/2017 | Tseng | H04L 5/001 370/329 |
| 2018/0020432 A1* | 1/2018 | Rico Alvarino | H04W 8/22 |

FOREIGN PATENT DOCUMENTS

EP     3310104 A1     4/2018

OTHER PUBLICATIONS

The 3rd Generation Partnership Project (3GPP TM), Technical Specification Group Radio Access Network; Evolved Universal Terrestrial Radio Access (E-UTRA); Radio Resource Control (RRC); Protocol specification (Release 13), 3GPP TS 36.331 V13.2.0, Jun. 2016, Valbonne, France.

* cited by examiner

*Primary Examiner* — Eric Myers
(74) *Attorney, Agent, or Firm* — ScienBiziP, P.C.

(57) ABSTRACT

The present invention provides a method for random access executed at user equipment (UE), comprising: receiving configuration information from a base station, the configuration information indicating an anchor carrier and/or one or a plurality of non-anchor carriers supporting a random access; selecting a carrier from the anchor carrier and/or the one or plurality of non-anchor carriers supporting a random access as a random access carrier according to the configuration information; and performing a random access by using the random access carrier. The present invention (Continued)

further provides a method for a random access executed at a base station, corresponding UE, and a corresponding base station.

4 Claims, 10 Drawing Sheets

100

| S110 | RECEIVE CONFIGURATION INFORMATION FROM A BASE STATION, THE CONFIGURATION INFORMATION INDICATING AN ANCHOR CARRIER AND/OR ONE OR A PLURALITY OF NON-ANCHOR CARRIERS SUPPORTING A RANDOM ACCESS |

↓

| S120 | SELECT A CARRIER FROM THE ANCHOR CARRIER AND/OR THE ONE OR PLURALITY OF NON-ANCHOR CARRIERS SUPPORTING A RANDOM ACCESS AS A RANDOM ACCESS CARRIER ACCORDING TO THE CONFIGURATION INFORMATION |

↓

| S130 | PERFORM A RANDOM ACCESS BY USING THE RANDOM ACCESS CARRIER |

FIG. 1

METHOD FOR EXECUTION OF RANDOM ACCESS, USER EQUIPMENT, AND BASE STATION

TECHNICAL FIELD

The present invention relates to the field of wireless communications technology. In particular, the present invention relates to a method for a random access, corresponding user equipment (UE), and a corresponding base station.

BACKGROUND

With the extensive application of the Internet of Things and its terminal devices, it becomes crucial to address the matter of designing a wireless network technology adapted for the communication of the Internet of Things. The 3rd Generation Partnership Project (3GPP) is currently developing a new access system for the purpose of designing a wireless access technology with low complexity and low throughput to meet the needs of the wireless Internet of Things, referred to as the Narrowband-Internet of Things (NB-IoT), aiming to design a wireless access technology with low complexity and low throughput to meet the needs of the wireless Internet of Things. The features of this access technology include: supporting large-scale devices with low throughput, low latency sensitivity, ultra-low device cost, ultra-low power consumption, and optimized network architecture.

In NB-IoT, such UE with low throughout, ultra-low device cost, and low power consumption supports only 180 kHz network bandwidth, i.e., a physical resource block in long term evolution (LTE), referred to as a carrier (or referred to as a cell); and the UE needs to support three deployment modes: a stand-alone deployment mode, a guard-band deployment mode, and an in-band deployment mode. The stand-alone mode of operation is to implement NB-IoT on the existing GSM frequency band, i.e., using the operating frequency band of an existing GERAN system and a scattering frequency band potentially deployed by the IoT. The guard-band mode of operation is to implement NB-IoT in the guard band of one LTE carrier, i.e., using a frequency band in the LTE frequency band that is used as the guard band. The in-band mode of operation is to implement NB-IoT in the existing LTE frequency band, i.e., using the frequency band in the LTE frequency band for actual transmission. Different bearer modes may adopt different physical parameters and processing mechanisms.

In Release 13, carriers of NB-IoT are divided into anchor carriers and non-anchor carriers. An anchor carrier is defined as a carrier where UE assumes that NB-IoT related data, such as a physical broadcast channel (PBCH), a primary synchronization signal (PSS)/secondary synchronization signal (SSS), or a system information block (SIB), is to be transmitted; and a non-anchor carrier is defined as a carrier where UE does not assumes that NB-IoT related data, such as a PBCH, a PSS, an SSS, or an SIB, is to be transmitted. That is, UE determines that the non-anchor carrier is only used to receive or send NB-IoT related unicast transmitted data, such as a physical downlink control channel (PDCCH), a physical downlink shared channel (PDSCH), or a physical uplink shared channel (PUSCH). When an eNB does not configure a non-anchor carrier for the UE, the anchor carrier may also be used by the UE to receive or send NB-IoT related unicast transmitted data, such as a PDCCH, a PDSCH, or a PUSCH. The eNB may configure a non-anchor carrier for the UE by using a radio resource control (RRC) connection establishment message, an RRC connection reestablishment message, an RRC connection reconfiguration message, an RRC connection recovery message, and the like.

In Release 13 NB-IoT, UE performs a random access process on only an anchor carrier. After a base station (eNB) configures a non-anchor carrier for UE, the UE will operate on the non-anchor carrier in an RRC connection process, until the UE needs to execute a random access or is reassigned with another non-anchor carrier. When the UE operating on the non-anchor carrier needs to execute a random access, the UE will return again to an anchor carrier to execute the random access.

3GPP RAN #72 meeting has approved a new Release 14 NB-IoT project to enhance the NB-IoT of Release 13, including support a random accesses on non-anchor carriers. However, no solution is provided in the prior art on how to support random accesses on non-anchor carriers.

SUMMARY OF INVENTION

In order to solve the above-mentioned technical problem, the present invention proposes a solution regarding how to support random accesses on non-anchor carriers.

According to a first aspect of the present invention, a method for a random access executed at user equipment (UE) is provided. The method comprises: receiving configuration information from a base station, the configuration information indicating an anchor carrier and/or one or a plurality of non-anchor carriers supporting a random access; selecting a carrier from the anchor carrier and/or the one or plurality of non-anchor carriers supporting a random access as a random access carrier according to the configuration information; and performing a random access by using the random access carrier.

In an embodiment, the selecting a carrier from the anchor carrier and/or the one or plurality of non-anchor carriers supporting a random access as a random access carrier according to the configuration information comprises: selecting a carrier from the anchor carrier and/or the one or plurality of non-anchor carriers supporting a random access indicated by the configuration information as the random access carrier in a random selection manner, an equal probability random selection manner, or in accordance with a predefined rule.

In an embodiment, if a downlink carrier on which the UE receives a paging message is configured with a corresponding uplink carrier and the uplink carrier supports a random access, the random access carrier is the uplink carrier.

In an embodiment, the selecting a carrier from the anchor carrier and/or the one or plurality of non-anchor carriers supporting a random access as a random access carrier according to the configuration information comprises: selecting, if a downlink carrier on which the UE receives a paging message is not configured with a corresponding uplink carrier or a configured corresponding uplink carrier does not support a random access, the anchor carrier supporting a random access indicated by the configuration information as the random access carrier, or selecting a carrier from the anchor carrier and/or the one or plurality of non-anchor carriers supporting a random access indicated by the configuration information as the random access carrier in a random selection manner, an equal probability random selection manner, or in accordance with a predefined rule.

In an embodiment, if a physical downlink control channel (PDCCH) or an upper layer specifies a carrier for the UE to execute a random access, the random access carrier is the specified carrier.

In an embodiment, the random access carrier is a non-anchor carrier having an RACH-ConfigCommon-NB and/or NPRACH-ConfigSIB-NB information element configured by means of RRC.

In an embodiment, if a serving carrier of the UE supports a random access, the random access carrier is the serving carrier.

In an embodiment, the selecting a carrier from the anchor carrier and/or the one or plurality of non-anchor carriers supporting a random access as a random access carrier according to the configuration information comprises: further selecting the random access carrier based on an enhanced coverage level of the UE.

In an embodiment, the selecting a carrier from the anchor carrier and/or the one or plurality of non-anchor carriers supporting a random access as a random access carrier according to the configuration information comprises: further selecting the random access carrier based on a data size.

In an embodiment, the selecting the random access carrier based on a data size comprises: comparing a potential message size with a predetermined threshold; and selecting the random access carrier according to a comparison result.

In an embodiment, the configuration information indicates one or a plurality of random access resource configurations for a random access.

In an embodiment, the configuration information comprises an indication for indicating whether a corresponding non-anchor carrier shares the same random access resource configuration with the anchor carrier.

In an embodiment, an RACH-ConfigCommon-NB and/or NPRACH-ConfigSIB-NB configuration of the anchor carrier is different from an RACH-ConfigCommon-NB and/or NPRACH-ConfigSIB-NB configuration of the non-anchor carrier.

In an embodiment, an NPRACH-ParametersList-NB configuration of the anchor carrier is different from an NPRACH-ParametersList-NB configuration of the non-anchor carrier.

In an embodiment, one or a plurality of non-anchor carriers in the one or plurality of non-anchor carriers share the same random access resource configuration with the anchor carrier.

In an embodiment, the random access resource configuration comprises at least one of: RACH-ConfigCommon-NB; NPRACH-ConfigSIB-NB; or NPRACH-ParametersList-NB.

In an embodiment, the configuration information comprises an indicator for indicating whether a corresponding anchor carrier or non-anchor carrier supports a random access. When the value of the indicator is set to "True" or "Setup" or "1", the corresponding anchor carrier or non-anchor carrier supports a random access; and when the value of the indicator is set to "False" or "Release" or "0", the corresponding non-anchor carrier does not support a random access.

In an embodiment, the configuration information comprises indicating whether a corresponding non-anchor carrier adopts the same random access resource configuration as that of the anchor carrier. When the value of the indicator is set to "True" or "Setup" or "1", the corresponding non-anchor carrier adopts the same random access resource configuration as that of the anchor carrier; and when the value of the indication is set to "False" or "Release" or "0" or the indication does not appear, the corresponding non-anchor carrier adopts a different random access resource configuration from that of the anchor carrier.

According to a second aspect of the present invention, a method for a random access executed at a base station is provided. The method comprises: generating configuration information, the configuration information indicating an anchor carrier and/or one or a plurality of non-anchor carriers supporting a random access; and sending to user equipment (UE) the configuration information for the UE to perform a random access.

In an embodiment, the sending to UE the configuration information comprises: broadcasting the configuration information in system information; or sending the configuration information by using RRC dedicated signaling.

According to a third aspect of the present invention, user equipment (UE) is provided. The UE comprises: a receiving unit, configured to receive configuration information from a base station, the configuration information indicating an anchor carrier and/or one or a plurality of non-anchor carriers supporting a random access; a selection unit, configured to select a carrier from the anchor carrier and/or the one or plurality of non-anchor carriers supporting a random access as a random access carrier according to the configuration information; and a random access executing unit, configured to perform a random access by using the random access carrier.

In an embodiment, the selection unit is further configured to: select a carrier from the anchor carrier and/or the one or plurality of non-anchor carriers supporting a random access indicated by the configuration information as the random access carrier in a random selection manner, an equal probability random selection manner, or in accordance with a predefined rule.

In an embodiment, if a downlink carrier on which the UE receives a paging message is configured with a corresponding uplink carrier and the uplink carrier supports a random access, the random access carrier is the uplink carrier.

In an embodiment, the selection unit is further configured to: select, if a downlink carrier on which the UE receives a paging message is not configured with a corresponding uplink carrier or a configured corresponding uplink carrier does not support a random access, the anchor carrier supporting a random access indicated by the configuration information as the random access carrier, or select a carrier from the anchor carrier and/or the one or plurality of non-anchor carriers supporting a random access indicated by the configuration information as the random access carrier in a random selection manner, an equal probability random selection manner, or in accordance with a predefined rule.

In an embodiment, if a physical downlink control channel (PDCCH) or an upper layer specifies a carrier for the UE to execute a random access, the random access carrier is the specified carrier.

In an embodiment, the random access carrier is a non-anchor carrier having an RACH-ConfigCommon-NB and/or NPRACH-ConfigSIB-NB information element configured by means of RRC.

In an embodiment, if a serving carrier of the UE supports a random access, the random access carrier is the serving carrier.

In an embodiment, the selection unit is further configured to: further select the random access carrier based on an enhanced coverage level of the UE.

In an embodiment, the selection unit is further configured to: further select the random access carrier based on a data size.

In an embodiment, the selecting the random access carrier based on a data size comprises: comparing a potential message size with a predetermined threshold; and selecting the random access carrier according to a comparison result.

In an embodiment, the configuration information indicates one or a plurality of random access resource configurations for a random access.

In an embodiment, the configuration information comprises an indication for indicating whether a corresponding non-anchor carrier shares the same random access resource configuration with the anchor carrier.

In an embodiment, an RACH-ConfigCommon-NB and/or NPRACH-ConfigSIB-NB configuration of the anchor carrier is different from an RACH-ConfigCommon-NB and/or NPRACH-ConfigSIB-NB configuration of the non-anchor carrier.

In an embodiment, an NPRACH-ParametersList-NB configuration of the anchor carrier is different from an NPRACH-ParametersList-NB configuration of the non-anchor carrier.

In an embodiment, one or a plurality of non-anchor carriers in the one or plurality of non-anchor carriers share the same random access resource with the anchor carrier.

In an embodiment, the random access resource configuration comprises at least one of: RACH-ConfigCommon-NB; NPRACH-ConfigSIB-NB; or NPRACH-ParametersList-NB.

In an embodiment, the configuration information comprises indicating whether a corresponding anchor carrier or non-anchor carrier supports a random access. When the value of the indicator is set to "True" or "Setup" or "1", the corresponding anchor carrier or non-anchor carrier supports a random access; and when the value of the indicator is set to "False" or "Release" or "0", the corresponding non-anchor carrier does not support a random access.

In an embodiment, the configuration information comprises indicating whether a corresponding non-anchor carrier adopts the same random access resource configuration as that of the anchor carrier. When the value of the indicator is set to "True" or "Setup" or "1", the corresponding non-anchor carrier adopts the same random access resource configuration as that of the anchor carrier; and when the value of the indication is set to "False" or "Release" or "0" or the indication does not appear, the corresponding non-anchor carrier adopts a different random access resource configuration from that of the anchor carrier.

According to a fourth aspect of the present invention, a base station is provided. The base station comprises: a generation unit, configured to generate configuration information, the configuration information indicating an anchor carrier and/or one or a plurality of non-anchor carriers supporting a random access; and a sending unit, configured to send to user equipment (UE) the configuration information for the UE to perform a random access.

In an embodiment, the sending unit is further configured to: broadcast the configuration information in system information; or send the configuration information by using RRC dedicated signaling.

With reference to the description and accompanying drawings hereinafter, the specific embodiments of the present invention are described in detail; and the manners in which the principle of the present invention is employed are illustrated. It should be understood that the embodiments of the present invention are not limited in scope. Within the spirit and scope defined by the appended claims, the embodiments of the present invention may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

BRIEF DESCRIPTION OF DRAWINGS

The above and other features of the present invention will be more pronounced through the following detailed description taken in conjunction with the accompanying drawings.

FIG. 1 schematically illustrates a flow diagram of a method 100 for a random access executed at UE according to an embodiment of the present invention;

DETAILED DESCRIPTION OF EMBODIMENTS

Figure 2:
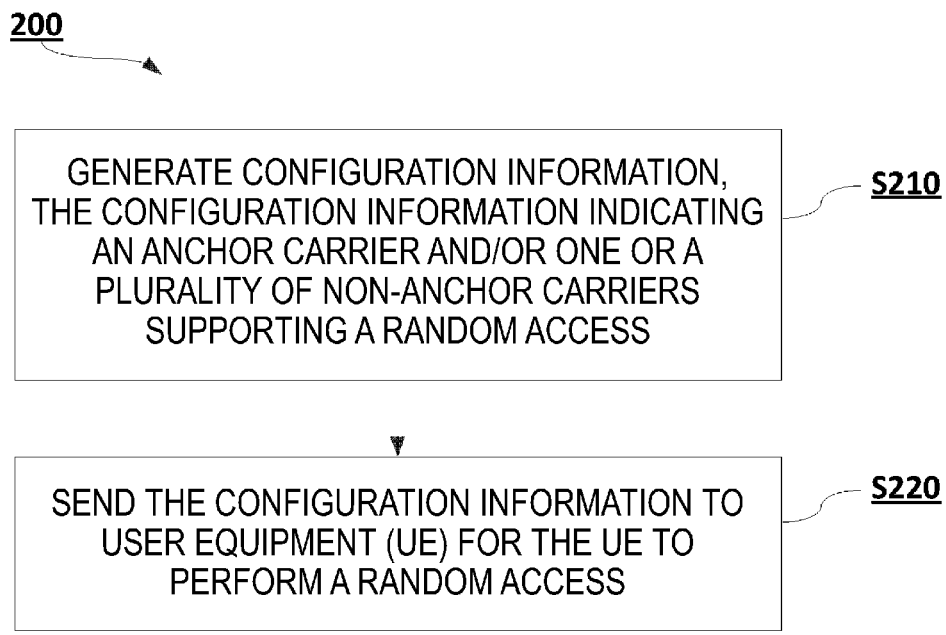
FIG. 2 schematically illustrates a flow diagram of a method 200 for a random access executed at a base station according to an embodiment of the present invention.

With reference to the accompanying drawings, the above described and other features of the present invention would be more pronounced through the description hereinafter. In the description and accompanying drawings, specific implementations of the present invention, which illustrate some implementations in which the principle of the present invention can be employed, are disclosed. It should be appreciated that the present invention shall not be limited to the specific implementations described below, but rather includes all of modifications, variations, and equivalents falling within the scope defined by the appended claims. In addition, for simplicity, detailed description of the known art not directly related to the present invention is omitted to prevent confusion with respect to the understanding of the present invention.

With reference to the accompanying drawings and specific embodiments, a random access method proposed by the present invention is described in more details hereinafter.

A plurality of embodiments according to the present invention are specifically described below by using an LTE mobile communications system and its later evolved versions as exemplary application environments and NB-IoT as an exemplary implementation technical scenario. However, it should be understood that the application environment of the present invention is not limited to the above exemplary application environments, but is applicable to more other wireless communications systems, such as a future 5G cellular communications system. Moreover, the implementation technical scenario of the present invention is also not limited to NB-IoT, but is also applicable to other non-NB-IoT devices and systems, such as an enhanced Machine Type Communication (MTC) scenario.

Hereinafter, description is provided by using an eNB as an example of a base station. However, it should be understood that the base station described in the present invention is not limited thereto, but may further comprise a variety of base stations such as a macro base station, a micro base station, or a pico base station.

Information Elements (IEs) mainly involved in the present invention are introduced below at first.

RACH-ConfigCommon-NB: This information element is used to specify the generic random access parameters, including at least one of the following parameters (also referred to as information elements): preambleTransMax-CE for indicating a maximum number of transmissions of a preamble, powerRampingParameters comprising a power ramping step powerRampingStep and preamble initial received target power preambleInitialReceivedTargetPower, and rach-InfoList comprising a set of ra-ResponseWindow-Size for indicating a random access response window size and mac-ContentionResolutionTimer for indicating a contention resolution time. It should be noted that RACH-ConfigCommon-NB may further comprise other general parameters for defining random access, in addition to the listed one or plurality of parameters.

NPRACH-ConfigSIB-NB: This information element is used to specify an NB-IoT Physical Random Access Channel (NPRACH) configuration, including at least one of the following parameters: nprach-CP-Length for indicating a transmission cycle prefix length of the NPRACH, rsrp-ThresholdsPrachInfoList for indicating that a criteria for UE to select an NPRACH resource, and nprach-ParametersList that respectively configures NPRACH parameters for a set of NPRACH resources.

NPRACH-ParametersList: This information element respectively configures NPRACH parameters for a set of NPRACH resources, including at least one of the following parameters: nprach-Periodicity for indicating an NPRACH resource period, nprach-StartTime for indicating a starting position of an NPRACH resource in one period, nprach-SubcarrierOffset for indicating a frequency domain position of an NPRACH resource, nprach-NumSubcarriers for indicating the number of subcarriers contained in one NPRACH resource, nprach-SubcarrierMSG3-RangeStart for calculating a starting subcarrier number of NPRACH subcarriers supporting multi-carrier Msg3 transmission reserved for UE, and maxNumPreambleAttemptCE for indicating the maximum number of transmissions of a preamble on each PRACH resource, numRepetitionsPerPreambleAttempt for indicating the number of repetitions upon each transmission of an NPRACH on each PRACH resource, npdcch-NumRepetitions-RA for indicating the maximum number of repetitions of an NPDCCH common search space related to an RAR, an Msg3 retransmission, and an Msg4, npdcch-StartSF-CSS-RA for indicating a starting subcarrier configuration of an NPDCCH common search space related to an RAR, an Msg3 retransmission, and an Msg4, and npdcch-Offset-RA for indicating a partial period offset of a starting subcarrier of an NPDCCH common search space (CSS). It should be noted that nprach-ParametersList may further comprise other parameters for configuring an NPRACH not directly contained in NPRACH-ConfigSIB-NB, in addition to the listed one or plurality of parameters.

It should be noted that in the present invention, RACH-ConfigCommon-NB, NPRACH-ConfigSIB-NB, and NPRACH-ParametersList-NB related to an anchor carrier are respectively represented as RACH-ConfigCommonAnchor-NB, NPRACH-ConfigSIB Anchor-NB, and NPRACH-ParametersListAnchor-NB; and RACH-ConfigCommon-NB, NPRACH-ConfigSIB-NB, and NPRACH-ParametersList-NB related to a non-anchor carrier are respectively represented as: RACH-ConfigCommon-NonAnchor-NB, NPRACH-ConfigSIBNonAnchor-NB, and NPRACH-ParametersListNonAnchor-NB.

A random access resource involved in the present invention refers to a parameter acquired by UE before executing a random access, which includes, but not limited to, all or part of parameters contained in the information element RACH-ConfigCommon-NB and/or the information element NPRACH-ConfigSIB-NB and/or the information element NPRACH-ParametersList-NB or the like.

A method for a random access executed at UE according to an embodiment of the present invention will be described below with reference to FIG. 1. FIG. 1 schematically illustrates a flow diagram of a method 100 for a random access executed at UE according to an embodiment of the present invention.

As shown in FIG. 1, at step S110, the UE receives configuration information from an eNB. The configuration information indicates an anchor carrier and/or one or a plurality of non-anchor carriers supporting a random access. The configuration information comprises at least configuration information of one or a plurality of non-anchor carriers available for a random access. The configuration information may be broadcasted in system information. For example, the configuration information is received via a SystemInformationBlockType2-NB IE defined by the 3GPP standard TS 36.331 and/or further via a RadioResourceConfigCommonSIB-NB IE contained in SystemInformationBlockType2-NB. The configuration information may also be sent by using RRC dedicated signaling. The RRC dedicated signaling may be an RRC reconfiguration message. For example, the configuration information is received via an RRCConnectionReconfiguration-NB IE defined by the TS 36.331 and/or further via a RadioResourceConfigDedicated-NB IE contained in RRCConnectionReconfiguration-NB. The RadioResourceConfigDedicated-NB information element is used to establish or modify or release a radio bear (RB) and/or modifying an MAC master configuration and modify a particular physical layer configuration.

It should be noted that a method for configuring an anchor carrier and/or non-anchor carrier related parameter (the parameter including but not limited to uplink and downlink carrier frequencies and a random access resource) involved in the present invention includes but not limited to: configuring the parameter in a broadcast manner (e.g., broadcasting the parameter in system information) or in a unicast manner (e.g., sending the parameter by using RRC dedicated signaling, wherein the RRC dedicated signaling may be an RRC reconfiguration message or the like).

At step S120, the UE selects a carrier from the anchor carrier and/or the one or plurality of non-anchor carriers supporting a random access as a random access carrier according to the configuration information.

In an implementation, step S120 may comprise: selecting a carrier from the anchor carrier and/or the one or plurality of non-anchor carriers supporting a random access indicated by the configuration information as a random access carrier in a random selection manner, an equal probability random selection manner, or in accordance with a predefined rule. For example, a carrier corresponding to a value obtained by performing a modulo operation (mod) on a UE identity with the number of random access carriers (which may comprise an anchor carrier and/or a non-anchor carrier) or the number of random access carriers corresponding to an enhanced coverage level n is used as the random access carrier. The UE identity may be a C-RNTI or an S-TMSI or an IMSI or other identities for distinguishing between different UE.

In an implementation, if a downlink carrier on which the UE receives a paging message is configured with a corresponding uplink carrier and the uplink carrier (which may be an uplink carrier corresponding to an anchor carrier or a non-anchor carrier) supports a random access, then the random access carrier is the uplink carrier, i.e., a carrier on which the UE receives a paging message.

In an implementation, step S120 may comprise: selecting, if a downlink carrier on which the UE receives a paging message is not configured with a corresponding uplink carrier or a configured corresponding uplink carrier does not support a random access, the anchor carrier supporting a random access indicated by the configuration information as the random access carrier, or selecting a carrier from the anchor carrier and/or the one or plurality of non-anchor carriers supporting a random access indicated by the configuration information as the random access carrier in a random selection manner, an equal probability random selection manner, or in accordance with a predefined rule.

In an implementation, if a physical downlink control channel (PDCCH) or an upper layer indicates a carrier for the UE to perform a random access, the random access carrier is the indicated carrier. For example, if a PDCCH order or an upper layer (e.g., RRC) indicates a carrier for the UE to perform a random access, the UE performs a random access on the indicated carrier. The PDCCH order may adopt the following method: carrying indication information in DCI. The indication information comprises an indication for indicating a frequency of an uplink/downlink carrier on which the UE executes a random access, or for indicating that a certain carrier in anchor carriers and/or non-anchor carriers available for a random access configured by the base station is to be used as a random access carrier. For example, the anchor carriers and/or non-anchor carriers are numbered according to the sequence of the carriers appearing in a configuration list, and a sequential number thereamong is indicated in the DCI.

In an implementation, the random access carrier is a non-anchor carrier having an RACH-ConfigCommon-NB and/or NPRACH-ConfigSIB-NB information element configured by means of RRC.

In an implementation, if a serving carrier of the UE (e.g., the UE can perform a receiving and/or sending operation of unicast data on the carrier) supports a random access (e.g., configured with a random access resource), the random access carrier is the serving carrier, i.e., the UE executes a random access on the serving carrier. The serving carrier may be an anchor carrier or a non-anchor carrier.

If the serving carrier of the UE (i.e., the UE can perform a receiving and/or sending operation of unicast data on the carrier) is not available as the random access carrier (e.g., not configured with a random access resource), the UE may select a carrier available for a random access to execute a random access. Preferably, the UE executes a random access on the anchor carrier (including uplink and downlink carriers). Alternatively, a carrier is selected from the anchor carrier and/or the one or plurality of non-anchor carriers supporting a random access indicated by the configuration information as a random access carrier in a random selection manner, an equal probability random selection manner, or in accordance with a predefined rule. For example, a carrier corresponding to a value obtained by performing a modulo operation (mod) on a UE identity with the number of random access carriers (which may comprise an anchor carrier and/or a non-anchor carrier) or the number of random access carriers corresponding to an enhanced coverage level n is used as the random access carrier. The UE identity may be a C-RNTI or an S-TMSI or an IMSI or other identities for distinguishing between different UE.

In an implementation, step S120 may comprise: further selecting the random access carrier based on an enhanced coverage level of the UE.

For example, the UE may select a corresponding carrier as the random access carrier based on a measured signal strength (measured RSRP or enhanced coverage level). That is, the UE determines a corresponding random access carrier (a plurality of corresponding random access carriers may exist) according to the measured RSRP; and if a plurality of corresponding random access carriers exist, the UE may select a carrier in an equal probability random selection manner or in accordance with a set rule. The set rule may comprise using a carrier corresponding to a value obtained by performing a modulo operation (mod) on a UE identity with an enhanced coverage level n as the random access carrier. The UE identity may be a C-RNTI or an S-TMSI or an IMSI or other identities for distinguishing between different UE. Alternatively, if the UE determines that its enhanced coverage level is n (for example, determining the enhanced coverage level according to measured RSRP), the UE selects a random access carrier corresponding to the enhanced coverage level n. If a plurality of random access carriers (which may comprise an anchor carrier and/or a non-anchor carrier) corresponding to the enhanced coverage level n exist, the UE may select a carrier in an equal probability random selection manner or in accordance with a set rule. The set rule may comprise using a carrier corresponding to a value obtained by performing a modulo operation (mod) on a UE identity with the enhanced coverage level n as the random access carrier. The UE identity may be a C-RNTI or an S-TMSI or an IMSI or other identities for distinguishing between different UE.

In an implementation, step S120 may comprise: further selecting the random access carrier based on a data size. For example, a potential message size is compared with a predetermined threshold, and then the random access carrier is selected according to a comparison result.

In an implementation, the configuration information indicates one or a plurality of random access resource configurations for a random access.

In an implementation, the configuration information comprises an indication for indicating whether a corresponding non-anchor carrier shares the same random access resource configuration with an anchor carrier.

In an implementation, an RACH-ConfigCommon-NB and/or NPRACH-ConfigSIB-NB configuration of the anchor carrier is different from an RACH-ConfigCommon-NB and/or NPRACH-ConfigSIB-NB configuration of the non-anchor carrier.

In an implementation, an NPRACH-ParametersList-NB configuration of the anchor carrier is different from an NPRACH-ParametersList-NB configuration of the non-anchor carrier.

In an implementation, one or a plurality of non-anchor carriers in the one or plurality of non-anchor carriers share the same random access resource configuration with the anchor carrier.

In an implementation, the random access resource configuration comprises at least one of: RACH-ConfigCommon-NB; NPRACH-ConfigSIB-NB; or NPRACH-ParametersList-NB.

In an implementation, the configuration information comprises an indicator for indicating whether a corresponding anchor carrier or non-anchor carrier supports a random access. When the value of the indicator is set to "True" or "Setup" or "1", the corresponding anchor carrier or non-anchor carrier supports a random access; and when the value of the indicator is set to "False" or "Release" or "0", the corresponding non-anchor carrier does not support a random access.

In an implementation, the configuration information comprises indicating whether a corresponding non-anchor carrier adopts the same random access resource configuration as that of the anchor carrier. When the value of the indicator is set to "True" or "Setup" or "1", the corresponding non-anchor carrier adopts the same random access resource configuration as that of the anchor carrier; and when the value of the indication is set to "False" or "Release" or "0" or the indication does not appear, the corresponding non-anchor carrier adopts a different random access resource configuration from that of the anchor carrier.

In an example, the UE randomly selects a carrier from anchor carriers and non-anchor carriers that can be used as random access carriers to execute a random access.

In another example, if one or a plurality of non-anchor carriers available for a random access are configured, the UE selects a non-anchor carrier from the non-anchor carriers as the random access carrier. Preferably, the UE randomly selects a non-anchor carrier from the non-anchor carriers as the random access carrier. Alternatively, the UE selects a non-anchor carrier as the random access carrier in accordance with a predefined rule. For example, a carrier corresponding to a value obtained by performing a modulo operation (mod) on a UE identity with the number of random access carriers (which may comprise an anchor carrier and/or a non-anchor carrier) or the number of random access carriers corresponding to an enhanced coverage level n is used as the random access carrier. The UE identity may be a C-RNTI or an S-TMSI or an IMSI or other identities for distinguishing between different UE.

In yet another example, if only one uplink carrier available for a random access is configured, the UE executes a random access on the uplink carrier. Preferably, the uplink carrier is an uplink carrier of an anchor carrier. Preferably, the UE uses a downlink carrier of the anchor carrier as a downlink carrier for executing a random access. Alternatively, the UE selects a carrier from configured downlink non-anchor carriers and/or downlink anchor carriers as a downlink carrier for executing a random access, for example, in an equal probability random selection manner. Optionally, the UE selects a non-anchor carrier from configured downlink non-anchor carriers and/or downlink anchor carriers as a downlink carrier for a random access in accordance with a predefined rule. For example, a carrier corresponding to a value obtained by performing a modulo operation (mod) on a UE identity with the number of random access downlink carriers (which may comprise an anchor carrier and/or a non-anchor carrier) or the number of random access downlink carriers corresponding to an enhanced coverage level n is used as the random access carrier. The UE identity may be a C-RNTI or an S-TMSI or an IMSI or other identities for distinguishing between different UE.

At step S130, the UE performs a random access by using the random access carrier.

A method for a random access executed at a base station according to an embodiment of the present invention will be described below with reference to FIG. 2. FIG. 2 schematically illustrates a flow diagram of a method 200 for a random access executed at a base station according to an embodiment of the present invention.

As shown in FIG. 2, at step S210, an eNB generates configuration information. The configuration information indicates an anchor carrier and/or one or a plurality of non-anchor carriers supporting a random access. For example, the configuration information herein may be the configuration information received by the UE from the eNB at step S110.

At step S220, the eNB sends to UE the configuration information for the UE to perform a random access.

Methods for configuring one or a plurality of non-anchor carriers as random access carriers and configuring a corresponding random access resource are described in detail below.

The configuration information of the non-anchor carrier may comprise one or a plurality of the following information elements: RACH-ConfigCommonNonanchor-NB, NPRACH-ConfigSIBNonanchor-NB, NPRACH-ParametersListNonanchor-NB, and dl-CarrierFreq, downlinkBitmapNonAnchor, dl-GapNonAnchor, and inbandCarrierinfo related to a downlink carrier configuration, and UL-CarrierConfigDedicated-NB related to an uplink carrier configuration. The information element dl-CarrierFreq is used to indicate a downlink carrier, which is a physical resource block that is not used to transmit an E-UTRA PSS/SSS/PBCH; the information element downlinkBitmapNonAnchor is used to indicate an NB-IoT downlink subframe configuration of a downlink transmission of a non-anchor carrier; the information element DL-GapNonAnchor is used to indicate a downlink transmission gap configuration of a non-anchor carrier; the information element inbandCarrierinfo comprises a configuration of an in-band non-anchor carrier, for example, information elements defined in the 3GPP standard TS 36.331, such as indexToMidPRB, eutraNumCRS-Ports, and eutraControlRegionSize; and the information element UL-CarrierConfigDedicated-NB is used to indicate an uplink carrier. The non-anchor carrier configuration information may be divided into two parts: non-anchor carrier common configuration information and non-anchor carrier dedicated configuration information. The non-anchor carrier common configuration information comprises non-anchor carrier configuration information shared by all non-anchor carriers. The non-anchor carrier dedicated configuration information comprises configuration information only applicable to corresponding non-anchor carriers. For example, the non-anchor carrier common configuration information may comprise the RACH-ConfigCommon-Nonanchor-NB and/or NPRACH-ConfigSIBNonanchor-NB and/or NPRACH-ParametersListNonanchor-NB and/or downlinkBitmapNonAnchor and/or DL-GapNonAnchor information element; and configuration information of other non-anchor carriers not contained in the non-anchor carrier common configuration information may be contained in the non-anchor carrier dedicated configuration information. If the information element dl-CarrierFreq and/or the information element UL-CarrierConfigDedicated-NB is contained in the non-anchor carrier common configuration information, it indicates that these non-anchor carriers may share an uplink carrier and/or a downlink carrier. If the dedicated configuration information of each non-anchor carrier does not comprise the information element dl-CarrierFreq and/or the information element UL-CarrierConfigDedicated-NB and the information element is contained in the common configuration information, an uplink carrier and/or a downlink carrier in the common configuration may be adopted; and if the dedicated configuration information of each non-anchor carrier does not comprise the information element dl-CarrierFreq and/or the information element UL-CarrierConfigDedicated-NB and the information element is also not contained in the common configuration information, an uplink carrier and/or downlink carrier of an anchor carrier may be adopted. Optionally, if the dedicated configuration information of each non-anchor carrier further comprises a carrier indication information element, the carrier indication information element is used to indicate whether a corresponding non-anchor carrier adopts an uplink carrier and/or a downlink carrier in the common configuration information or adopts an uplink carrier and/or a downlink carrier of an anchor carrier when dedicated configuration information of a certain non-anchor carrier does not comprise the information element dl-CarrierFreq and/or the information element UL-CarrierConfigDedicated-NB. Specifically, when the value of the indication information element is set to "true" or "setup" or "1", the UE determines that the corresponding non-anchor carrier adopts the uplink carrier and/or the downlink carrier in the common configuration information; when the value of the indication information element is set to "false" or "release" or "0" or the indicator is absent, the UE determines that the corresponding non-anchor carrier adopts the uplink carrier and/or the downlink carrier of the anchor carrier; and vice versa.

Optionally, the non-anchor carrier configuration information further comprises a first indicator for indicating whether a corresponding non-anchor carrier can be used as a random access carrier; and the first indicator may be contained in the non-anchor carrier dedicated configuration information. Specifically, when the value of the indicator is set to "true" or "setup" or "1", the UE determines that the corresponding non-anchor carrier can be used as a random access carrier (i.e., the UE can executes a random access on the carrier); when the value of the indicator is set to "false" or "release" or "0" or the indicator is absent, the UE determines that the corresponding non-anchor carrier is not to be used as a random access carrier; and vice versa.

Optionally, the non-anchor carrier configuration information further comprises a second indicator used to indicate whether a corresponding non-anchor carrier adopts a random access resource configuration of an anchor carrier or indicate whether a PSS/SSS/NPBCH/SIB-NB has been transmitted on the non-anchor carrier (if a PSS/SSS/NPBCH/SIB-NB has been transmitted on the non-anchor carrier, the non-anchor carrier can adopt the random access resource configuration of the anchor carrier). Specifically, when the value of the indicator is set to "true" or "setup" or "1", the UE determines that the corresponding non-anchor carrier adopts the random access resource configuration of the anchor carrier; and when the value of the indicator is set to "false" or "release" or "0" or the indicator is absent, the UE determines that the corresponding non-anchor carrier does not adopt the random access resource configuration of the anchor carrier. The second indicator may be contained in the non-anchor carrier dedicated configuration information.

Optionally, the non-anchor carrier configuration information further comprises a third indicator used to indicate an enhanced coverage level (the number of repetitions or a repetition level) of UE for which a corresponding non-anchor carrier can be used as a random access carrier therefor. Specifically, the UE compares a measured signal strength (e.g., an RSRP value) with the value of the third indicator; and if the measured signal strength is greater than or lower than the value of the third indicator, the corresponding non-anchor carrier can be used as a random access carrier for the UE. The third indicator may be contained in the non-anchor carrier dedicated configuration information.

Optionally, the configuration information further comprises a fourth indicator used to indicate whether an anchor carrier can be used as a random access carrier (an uplink carrier on which the UE can transmit an uplink message such as a preamble and a corresponding downlink carrier on which the UE can receive a downlink message such as a random access response (RAR)). Specifically, when the value of the indicator is set to "true" or "setup" or "1", the UE determines that an anchor carrier can be used as a random access carrier; when the value of the indicator is set to "false" or "release" or "0" or the indicator is absent, the UE determines that an anchor carrier cannot be used as a random access carrier; and vice versa.

Optionally, the configuration information further comprises a threshold for the UE to select a carrier for executing a random access. If a random access is triggered by an upper layer (e.g., a CCCH logical channel), the UE compares a size of a service data unit (SDU) of a CCCH plus an MAC header with the threshold, and selects a carrier for the random access from corresponding random access carriers according to a comparison result. If a random access is not triggered by an upper layer (i.e., a CCCH logical channel), the UE compares a potential message size (which may comprise uplink transmission data plus an MAC header plus an MAC control element required to be transmitted) with the threshold, and selects a carrier for the random access from corresponding random access carriers according to a comparison result. For example, if the size of the SDU of the CCCH plus the MAC header or the potential message size is lower than the threshold, the UE executes a random access on an anchor carrier; if the size of the SDU of the CCCH plus the MAC header or the potential message size is greater than the threshold, the UE executes a random access on a non-anchor carrier (e.g., if a plurality of non-anchor carriers are available for a random access, one of the non-anchor carriers may be randomly selected or selected in accordance with a predefined rule). For example, a carrier corresponding to a value obtained by performing a modulo operation (mod) on a UE identity with the number of random access carriers (which may comprise an anchor carrier and/or a non-anchor carrier) or the number of random access carriers corresponding to an enhanced coverage level n is used as a random access carrier. The UE identity may be a C-RNTI or an S-TMSI or an IMSI or other identities for distinguishing between different UE; and vice versa.

Optionally, the configuration information comprises configuration information of a plurality of sets of non-anchor carriers, and each set of non-anchor carriers is respectively used by UE at different coverage levels (the number of repetitions) to execute a random access. Each set of non-anchor carriers may also be respectively configured with different random access resources, and the plurality of sets of non-anchor carriers may share part of random access resource configurations. For example, the plurality of sets of non-anchor carriers share RACH-ConfigCommon-NB and/or NPRACH-ConfigSIB-NB and/or NPRACH-ParametersList-NB.

Optionally, the configuration information further comprises an anchor carrier related random access resource configuration and a non-anchor carrier related random access resource configuration. Preferably, the anchor carrier and the non-anchor carrier may share part of parameters of a random access resource configuration. That is, the random access resource configurations of the anchor carrier and the non-anchor carrier comprise a common random access resource configuration part and a dedicated random access resource configuration part. The common random access resource configuration part comprises a random access resource configuration parameter applicable to the anchor carrier and the non-anchor carrier, whereas a random access resource configuration parameter contained in the dedicated random access resource configuration part is only applicable to the anchor carrier or the non-anchor carrier.

Specifically, the eNB configures common RACH-ConfigCommon-NB for an anchor carrier and all non-anchor carriers, and configures NPRACH-ConfigSIBAnchor-NB and/or NPRACH-ParametersListAnchor-NB for the anchor carrier; and the eNB configures NPRACH-ConfigSIBNonAnchor-NB and/or NPRACH-ParametersListNonAnchor-NB for the non-anchor carriers.

Alternatively, the eNB configures common NPRACH-ConfigSIB-NB for an anchor carrier and all non-anchor carriers, and configures RACH-ConfigCommonAnchor-NB and/or NPRACH-ParametersListAnchor-NB for the anchor carrier; and the eNB configures RACH-ConfigCommonNonAnchor-NB and/or NPRACH-ParametersListNonAnchor-NB for the non-anchor carriers.

Alternatively, the eNB configures common NPRACH-ParametersList-NB for an anchor carrier and all non-anchor carriers, and configures RACH-ConfigCommonAnchor-NB and/or NPRACH-ConfigSIBAnchor-NB for the anchor carrier; and the eNB configures RACH-ConfigCommon-NonAnchor-NB and/or NPRACH-ConfigSIBNonAnchor-NB for the non-anchor carriers.

Alternatively, the eNB configures common RACH-ConfigCommon-NB and NPRACH-ConfigSIB-NB for an anchor carrier and all non-anchor carriers, and configures NPRACH-ParametersListAnchor-NB for the anchor carrier; and the eNB configures NPRACH-ParametersListNonAnchor-NB for the non-anchor carriers.

Alternatively, the eNB configures common NPRACH-ParametersList-NB and RACH-ConfigCommon-NB for an anchor carrier and all non-anchor carriers, and configures NPRACH-ConfigSIBAnchor-NB for the anchor carrier; and the eNB configures NPRACH-ConfigSIBNonAnchor-NB for the non-anchor carriers.

Alternatively, the eNB configures common NPRACH-ParametersList-NB and NPRACH-ConfigSIB-NB for an anchor carrier and all non-anchor carriers, and configures RACH-ConfigCommonAnchor-NB for the anchor carrier; and the eNB configures RACH-ConfigCommonNonAnchor-NB for the non-anchor carriers.

Alternatively, the eNB configures common RACH-ConfigCommon-NB, NPRACH-ConfigSIB-NB, and NPRACH-ParametersList-NB for an anchor carrier and all non-anchor carriers. In this case, the anchor carrier and all of the non-anchor carriers adopt the same random access resource configuration.

Alternatively, the eNB configures common RACH-ConfigCommonNonAnchor-NB and/or NPRACH-ConfigSIBNonAnchor-NB and/or NPRACH-ParametersListNonAnchor-NB for all non-anchor carriers.

Alternatively, the eNB respectively configures RACH-ConfigCommonNonAnchor-NB and/or NPRACH-ConfigSIBNonAnchor-NB and/or NPRACH-ParametersListNonAnchor-NB for each non-anchor carrier. Optionally, if a certain non-anchor carrier available for a random access is not configured with part or all of random access resources (which may comprise RACH-ConfigCommonNonAnchor-NB and/or NPRACH-ConfigSIBNonAnchor-NB and/or NPRACH-ParametersListNonAnchor-NB), it is considered that a random access resource of the corresponding non-anchor carrier is identically configured with respect to a random access resource of an anchor carrier.

Alternatively, the eNB may include configuration information of a non-anchor carrier in one or a plurality of separate information elements, and place a configuration of one or a plurality of random access resources in one or a plurality of other separate information elements, and then respectively indicate in each of configured random access resources non-anchor carriers to which a corresponding random access resource is to be applied. For example, assuming that 5 non-anchor carriers are configured and configuration information of the non-anchor carriers comprises part or all of the following information elements: dl-CarrierFreq, downlinkBitmapNonAnchor, dl-GapNonAnchor, and inbandCarrierInfo related to a downlink carrier configuration, and UL-CarrierConfigDedicated-NB related to an uplink carrier configuration; and 3 random access resources are configured and the random access resources comprise part or all of the following information elements: RACH-ConfigCommonNonanchor-NB, NPRACH-ConfigSIBNonanchor-NB, and NPRACH-ParametersListNonanchor-NB, or the like. The eNB respectively indicates in the random access resources non-anchor carriers to which the random access resources are to be applied. Specifically, configured non-anchor carriers may be indicated in the form of a bitmap; or the configured non-anchor carriers may be numbered and then the numbers are indicated.

It should be noted that if random access resources (which may comprise RACH-ConfigCommonNonAnchor-NB and/or NPRACH-ConfigSIBNonAnchor-NB and/or NPRACH-ParametersListNonAnchor-NB) are not contained in configuration information respectively corresponding to an anchor carrier and a non-anchor carrier but are present as common information in the form of a list, which random access resources in the list to which respective random access resources of the anchor carrier and the non-anchor carrier respectively correspond should be indicated. Specifically, assuming that the list comprise two RACH-ConfigCommonNonAnchor-NB and/or two NPRACH-ConfigSIBNonAnchor-NB and/or two NPRACH-ParametersListNonAnchor-NB, the first RACH-ConfigCommonNonAnchor-NB and/or NPRACH-ConfigSIBNonAnchor-NB and/or NPRACH-ParametersListNonAnchor-NB in the list may be specified as a random access resource configuration of an anchor carrier; the second RACH-ConfigCommonNonAnchor-NB and/or NPRACH-ConfigSIBNonAnchor-NB and/or NPRACH-ParametersListNonAnchor-NB in the list may be specified as a random access resource configuration of a non-anchor carrier; and vice versa.

Figure 3:
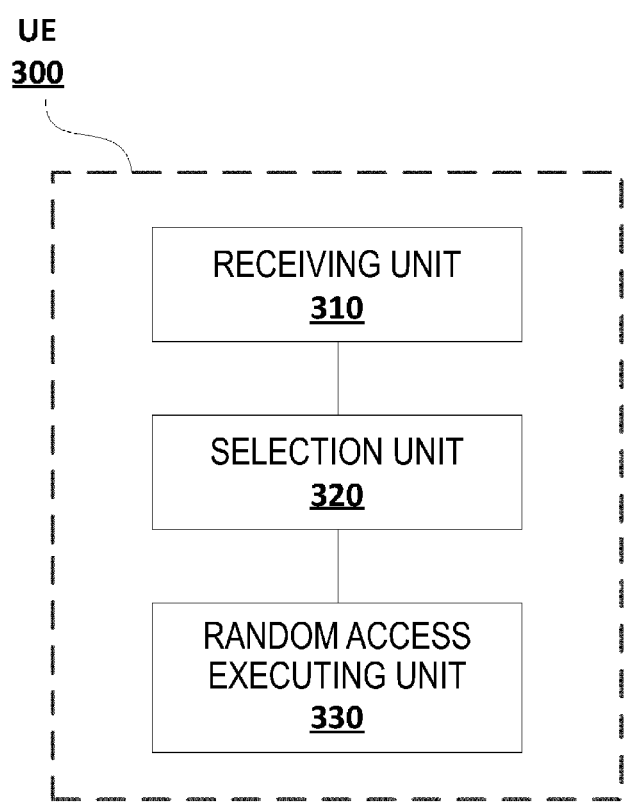
FIG. 3 schematically illustrates a structural block diagram of UE 300 according to an embodiment of the present invention.

UE according to an embodiment of the present invention will be described below with reference to FIG. 3. FIG. 3 schematically illustrates a structural block diagram of UE 300 according to an embodiment of the present invention.

The UE 300 can perform the method for a random access according to an embodiment of the present invention, for example, the method 100 described in detail previously as shown in FIG. 1.

As shown in FIG. 3, the UE 300 comprises a receiving unit 310, a selection unit 320, and a random access executing unit 330. Those skilled in the art should understand that only the receiving unit 310, the selection unit 320, and the random access executing unit 330 related to the present invention are shown in the UE 300 of FIG. 3 to avoid confusion of the present invention. However, those skilled in the art should understand that although not shown in FIG. 3, the UE according to the embodiment of the present invention further comprises other basic units that form the UE.

The receiving unit 310 is configured to receive configuration information from a base station, the configuration information indicating an anchor carrier and/or one or a plurality of non-anchor carriers supporting a random access.

The selection unit 320 is configured to select a carrier from the anchor carrier and/or the one or plurality of non-anchor carriers supporting a random access as a random access carrier according to the configuration information.

The random access executing unit 330 is configured to execute a random access by using the random access carrier.

In an implementation, the selection unit 320 is further configured to: select a carrier from the anchor carrier and/or the one or plurality of non-anchor carriers supporting a random access indicated by the configuration information as the random access carrier in a random selection manner, an equal probability random selection manner, or in accordance with a predefined rule.

In an implementation, if a downlink carrier on which the UE receives a paging message is configured with a corresponding uplink carrier and the uplink carrier supports a random access, the random access carrier is the uplink carrier.

In an implementation, the selection unit 320 is further configured to: select, if a downlink carrier on which the UE receives a paging message is not configured with a corresponding uplink carrier or a configured corresponding uplink carrier does not support a random access, the anchor carrier supporting a random access indicated by the configuration information as the random access carrier, or select a carrier from the anchor carrier and/or the one or plurality of non-anchor carriers supporting a random access indicated by the configuration information as the random access carrier in a random selection manner, an equal probability random selection manner, or in accordance with a predefined rule.

In an implementation, if a physical downlink control channel (PDCCH) or an upper layer specifies a carrier for the UE to execute a random access, the random access carrier is the specified carrier.

In an implementation, the random access carrier is a non-anchor carrier having an RACH-ConfigCommon-NB and/or NPRACH-ConfigSIB-NB information element configured by means of RRC.

In an implementation, if a serving carrier of the UE supports a random access, the random access carrier is the serving carrier.

In an implementation, the selection unit 320 is further configured to: further select the random access carrier based on an enhanced coverage level of the UE.

In an implementation, the selection unit 320 is further configured to: further select the random access carrier based on a data size.

In an implementation, the selecting the random access carrier based on a data size comprises: comparing a potential message size with a predetermined threshold; and selecting the random access carrier according to a comparison result.

In an implementation, the configuration information indicates one or a plurality of random access resource configurations for a random access.

In an implementation, the configuration information comprises an indication for indicating whether a corresponding non-anchor carrier shares the same random access resource configuration with the anchor carrier.

In an implementation, an RACH-ConfigCommon-NB and/or NPRACH-ConfigSIB-NB configuration of the anchor carrier is different from an RACH-ConfigCommon-NB and/or NPRACH-ConfigSIB-NB configuration of the non-anchor carrier.

In an implementation, an NPRACH-ParametersList-NB configuration of the anchor carrier is different from an NPRACH-ParametersList-NB configuration of the non-anchor carrier.

In an implementation, one or a plurality of non-anchor carriers in the one or plurality of non-anchor carriers share the same random access resources with the anchor carrier.

In an implementation, the random access resource configuration comprises at least one of: RACH-ConfigCommon-NB; NPRACH-ConfigSIB-NB; or NPRACH-ParametersList-NB.

In an implementation, the configuration information comprises an indicator for indicating whether a corresponding anchor carrier or non-anchor carrier supports a random access. When the value of the indicator is set to "True" or "Setup" or "1", the corresponding anchor carrier or non-anchor carrier supports a random access; and when the value of the indicator is set to "False" or "Release" or "0", the corresponding non-anchor carrier does not support a random access.

In an implementation, the configuration information comprises indicating whether a corresponding non-anchor carrier adopts the same random access resource configuration as that of the anchor carrier. When the value of the indicator is set to "True" or "Setup" or "1", the corresponding non-anchor carrier adopts the same random access resource configuration as that of the anchor carrier; and when the value of the indication is set to "False" or "Release" or "0" or the indication does not appear, the corresponding non-anchor carrier adopts a different random access resource configuration from that of the anchor carrier.

Figure 4:
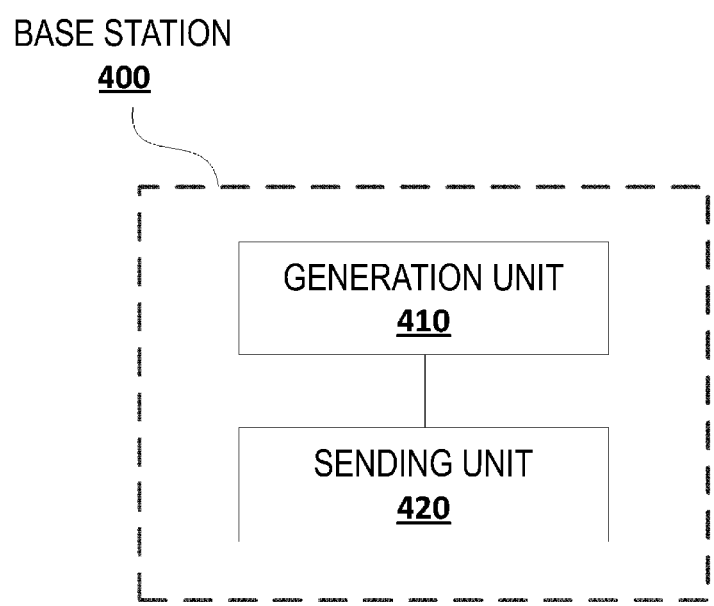
FIG. 4 schematically illustrates a structural block diagram of a base station 400 according to an embodiment of the present invention.

A base station according to an embodiment of the present invention will be described below with reference to FIG. 4. FIG. 4 schematically illustrates a structural block diagram of a base station 400 according to an embodiment of the present invention. The base station 400 can perform the method for a random access according to an embodiment of the present invention, for example, the method 200 described in detail previously as shown in FIG. 2.

As shown in FIG. 4, the base station 400 comprises a generation unit 410 and a sending unit 420. Those skilled in the art should understand that only the generation unit 410 and the sending unit 420 related to the present invention are shown in the base station 400 of FIG. 4 to avoid confusion of the present invention. However, those skilled in the art should understand that although not shown in FIG. 4, the base station according to the embodiment of the present invention further comprises other basic units that form the base station.

The generation unit 410 is configured to generate configuration information, the configuration information indicating an anchor carrier and/or one or a plurality of non-anchor carriers supporting a random access.

The sending unit 420 is configured to send to user equipment (UE) the configuration information for the UE to perform random access.

In an implementation, the sending unit 420 is further configured to: broadcast the configuration information in system information; or send the configuration information by using RRC dedicated signaling.

A random access method in a switching scenario is provided below, i.e., a process of UE randomly accessing a target base station during a switching process from a source base station to the target base station. A method for determining whether an anchor carrier or a non-anchor carrier is a carrier supporting a random access and a selection method by which UE selects a non-anchor carrier from one or a plurality of non-anchor carriers supporting a random access to perform a random access involved in the following embodiments include but not limited to those described previously in the present invention, and are not repeatedly described in the following embodiments.

In the present invention, a carrier may also be expressed as a cell or a physical resource block (PRB).

Figure 5:
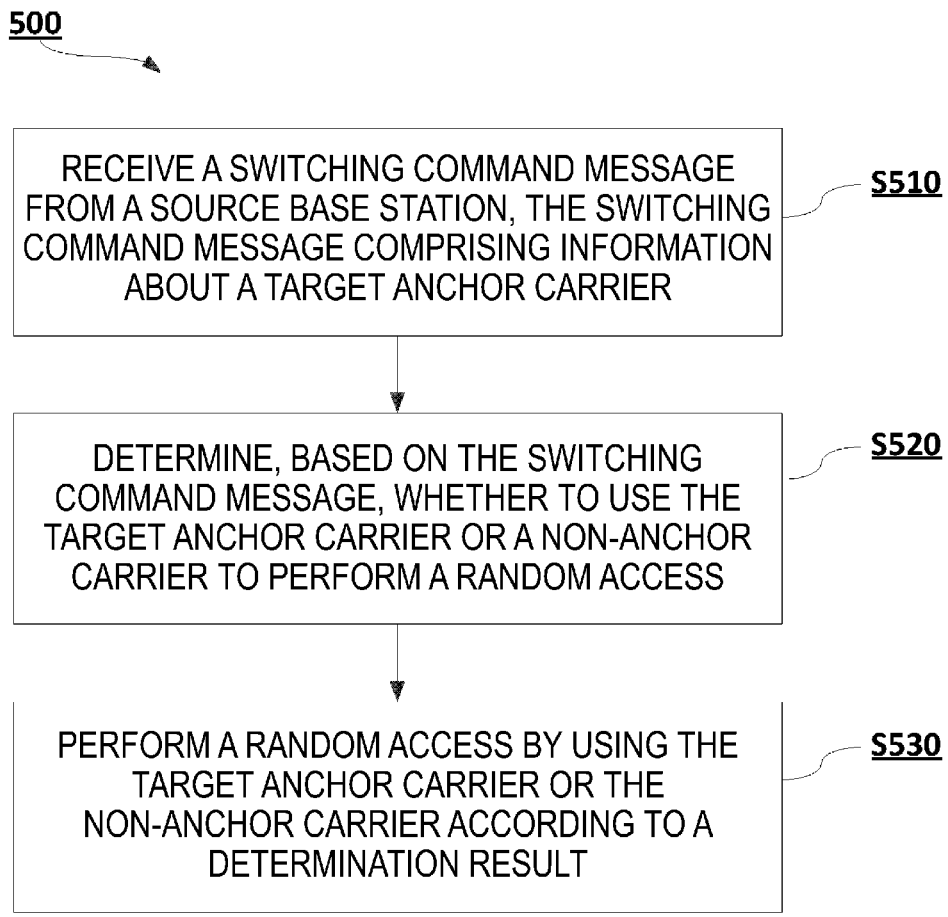
FIG. 5 schematically illustrates a flow diagram of a method 500 for a random access executed at UE according to an embodiment of the present invention.

A method for a random access executed at UE according to an embodiment of the present invention will be described below with reference to FIG. 5. FIG. 5 schematically illustrates a flow diagram of a method 500 for a random access executed at UE according to an embodiment of the present invention.

As shown in FIG. 5, at step S510, the UE receives a switching command message from an eNB. The switching command message comprises information about a target anchor carrier, i.e., information for indicating a target carrier or a target cell for a current switching. In this step, the switching command message is used to instruct the UE to perform a switching operation. For example, the switching command message may be an RRC connection reconfiguration message comprising a mobility control information (mobilitycontrolinfo) information element. Optionally, the switching command message may also comprise non-anchor carrier configuration information about a target non-anchor carrier, for configuring a non-anchor carrier (also referred to as a target non-anchor carrier) to be used by the UE during or after the current switching process.

At step S520, the UE determines, based on the switching command message, whether to use the target anchor carrier or a non-anchor carrier to perform a random access.

Optionally, prior to S520, the UE begins to perform downlink synchronization to synchronize to the target anchor carrier and/or receives system information on the target anchor carrier. The system information herein comprises related information to be acquired for executing a random access on the target non-anchor carrier, for example, non-anchor carrier configuration information, including an RACH configuration and a PRACH configuration corresponding to a non-anchor carrier. For example, the non-anchor carrier configuration information may be a non-anchor carrier frequency or index number, indication information for indicating whether a non-anchor carrier is a random access carrier, downlinkBitmapNonAnchor, dl-GapNonAnchor, and inbandCarrierinfo configurations corresponding to a non-anchor carrier, or the like. For specific details, refer to the foregoing random access configuration section of the present invention. Alternatively, the UE may acquire the related information to be acquired for executing a random access on the target non-anchor carrier from the eNB by means of dedicated signaling, for example, in a switching command.

In an implementation, step S520 may comprise: determining, if the switching command message does not comprise the non-anchor carrier configuration information about the target non-anchor carrier, to use the target anchor carrier to perform a random access.

For example, if the switching command message does not comprise the non-anchor carrier configuration information, the UE may perform one or a plurality of the following operations:
  if the switching command message comprises a dedicated random access channel configuration (RACH-ConfigDedicated), the UE determining that the dedicated random access channel configuration is directed to the target anchor carrier; and
  the UE executing a random access on the target anchor carrier.

In an implementation, step S520 may comprise: determining, if the switching command message comprises the non-anchor carrier configuration information about the target non-anchor carrier and the switching command message or the target cell system information does not comprise random access configuration information corresponding to the target non-anchor carrier, to use the target anchor carrier to perform a random access.

For example, if the switching command message comprises the non-anchor carrier configuration information and the switching command message or the target cell system information does not comprise the random access configuration information corresponding to the target non-anchor carrier (e.g., the random access configuration information may comprise nprach-config and/or rach-configcommon), the UE performs one or a plurality of the following operations:
  if the switching command message comprises a dedicated random access channel configuration (RACH-ConfigDedicated), the UE determining that the dedicated random access channel configuration is directed to the target anchor carrier; and
  the UE executing a random access on the target anchor carrier.

In an implementation, step S520 may comprise: determining, if the switching command message comprises the non-anchor carrier configuration information about the target non-anchor carrier and the target non-anchor carrier indicated by the non-anchor carrier configuration information does not support a random access, to use the target anchor carrier to perform a random access.

For example, if the switching command message comprises the non-anchor carrier configuration information and the target non-anchor carrier indicated by the non-anchor carrier configuration information is not a random access carrier, the UE performs one or a plurality of the following operations:
  if the switching command message comprises a dedicated random access channel configuration (RACH-ConfigDedicated), the UE determining that the dedicated random access channel configuration is directed to the anchor carrier; and
  the UE executing a random access on the target anchor carrier.

In this implementation, the anchor carrier refers to the target anchor carrier; that the non-anchor carrier is not a random access carrier may be learned from indication information received from the eNB, or may be learned based on the fact that a random access carrier list received from the eNB does not comprise the non-anchor carrier, or may be learned based on the fact that the non-anchor carrier list received from the eNB comprises the non-anchor carrier but does not comprise an RA carrier indication (e.g., the foregoing first indicator) corresponding to the non-anchor carrier. However, the present invention is not limited to the above-described methods.

In an implementation, step S520 may comprise: determining, if the switching command message comprises the non-anchor carrier configuration information about the target non-anchor carrier and the switching command message or the target cell system information comprises the random access configuration information corresponding to the target non-anchor carrier, to use the target non-anchor carrier to perform a random access.

For example, if the switching command message comprises the non-anchor carrier configuration information and the switching command message or the target cell system information comprises the random access configuration information corresponding to the target non-anchor carrier (e.g., the random access configuration information may comprise nprach-config and/or rach-configcommon), the UE performs one or a plurality of the following operations:
  if the switching command message comprises a dedicated random access channel configuration (RACH-ConfigDedicated), the UE determining that the dedicated random access channel configuration is directed to the non-anchor carrier; and
  the UE executing a random access on the target non-anchor carrier.

In an implementation, step S520 may comprise: determining, if the switching command message comprises the non-anchor carrier configuration information about the target non-anchor carrier and the target non-anchor carrier indicated by the non-anchor carrier configuration information supports a random access, to use the target non-anchor carrier to perform a random access.

For example, if the switching command message comprises the non-anchor carrier configuration information, the UE performs one or a plurality of the following operations:
  if the switching command message comprises a dedicated random access channel configuration (RACH-ConfigDedicated), the UE determining that the dedicated random access channel configuration is directed to the target non-anchor carrier; and
  the UE executing a random access on the target non-anchor carrier.

In an implementation, step S520 may comprise: determining, if the switching command message comprises the non-anchor carrier configuration information about the target non-anchor carrier, to use the target non-anchor carrier to perform a random access.

For example, if the switching command message comprises the non-anchor carrier configuration information and the target non-anchor carrier indicated by the non-anchor carrier configuration information supports a random access, the UE performs one or a plurality of the following operations:
  if the switching command message comprises a dedicated random access channel configuration (RACH-ConfigDedicated), the UE determining that the dedicated random access channel configuration is directed to the non-anchor carrier; and
  the UE executing a random access on the target non-anchor carrier.

In this implementation, that the target non-anchor carrier supports a random access may be learned according to the explicit indication information received from the eNB, but the present invention is not limited to this method.

In an implementation, step S520 may comprise: selecting, if the switching command message comprises the non-anchor carrier configuration information about the target non-anchor carrier, the switching command message or the target cell system information indicates that the target anchor carrier does not support a random access, and the non-anchor carrier configuration information indicates that the target non-anchor carrier does not support a random access, a non-anchor carrier from one or a plurality of carriers supporting a random access to perform a random access.

For example, if the switching command message comprises the non-anchor carrier configuration information and the switching command message or the target cell system information comprises an indication (e.g., the foregoing fourth indicator) for indicating that the target anchor carrier does not support a random access, the UE performs one or a plurality of the following operations:
  if the target non-anchor carrier supports a random access, then
  if the switching command message comprises a dedicated random access channel configuration (RACH-ConfigDedicated), the UE determining that the dedicated random access channel configuration is directed to the target non-anchor carrier; and
  the UE executing a random access on the target non-anchor carrier; or
  if the target non-anchor carrier does not support a random access, then
  the UE selecting a non-anchor carrier from one or a plurality of carriers supporting a random access as a random access carrier (for example, the non-anchor carrier may be selected by using the method 100 in FIG. 1); and
  if the switching command message comprises a dedicated random access channel configuration (RACH-ConfigDedicated), the UE determining that the dedicated random access channel configuration is directed to the selected non-anchor carrier; and
  the UE executing a random access on the selected non-anchor carrier.

In an implementation, step S520 may comprise: selecting, if the switching command message does not comprise the non-anchor carrier configuration information about the target non-anchor carrier and/or the switching command message or the target cell system information indicates that the target anchor carrier does not support a random access, a non-anchor carrier for random access from one or a plurality of carriers supporting a random access.

For example, if the switching command message does not comprise the non-anchor carrier configuration information and/or the switching command message or the target cell system information indicates that the target anchor carrier does not support a random access, the UE performs one or a plurality of the following operations:
  the UE selecting one non-anchor carrier from one or a plurality of carriers supporting a random access as a random access carrier (for example, the non-anchor carrier may be selected by using the method 100 in FIG. 1); and
  if the switching command message comprises a dedicated random access channel configuration (RACH-ConfigDedicated), the UE determining that the dedicated random access channel configuration is directed to the selected non-anchor carrier; and the UE executing a random access on the selected non-anchor carrier.

In an implementation, step S520 may comprise: selecting, if the switching command message comprises the non-anchor carrier configuration information about the target non-anchor carrier, the switching command message or the target cell system information does not comprise the random access configuration message corresponding to the target non-anchor carrier, a non-anchor carrier from one or a plurality of carriers supporting a random access to perform a random access.

For example, if the switching command message comprises the non-anchor carrier configuration information and the switching command message or the target cell system information does not comprise the random access configuration information corresponding to the target non-anchor carrier (e.g., the random access configuration information comprises nprach-config and/or rach-configcommon or the like), the UE performs one or a plurality of the following operations:

the UE selecting a non-anchor carrier from one or a plurality of carriers supporting a random access as a random access carrier (for example, the non-anchor carrier may be selected by using the method 100 in FIG. 1); and if the switching command message comprises a dedicated random access channel configuration (RACH-ConfigDedicated), the UE determining that the dedicated random access channel configuration is directed to the selected non-anchor carrier; and the UE executing a random access on the selected non-anchor carrier.

In an implementation, step S520 may comprise: selecting, if the switching command message comprises the non-anchor carrier configuration information about the target non-anchor carrier and the target non-anchor carrier does not support a random access, a non-anchor carrier from one or a plurality of carriers supporting a random access to perform a random access.

For example, if the switching command message comprises the non-anchor carrier configuration information and the target non-anchor carrier does not support a random access, the UE performs one or a plurality of the following operations:

the UE selecting a non-anchor carrier from one or a plurality of carriers supporting a random access as a random access carrier (for example, the non-anchor carrier may be selected by using the method 100 in FIG. 1); and if the switching command message comprises a dedicated random access channel configuration (RACH-ConfigDedicated), the UE determining that the dedicated random access channel configuration is directed to the selected non-anchor carrier; and the UE executing a random access on the selected non-anchor carrier.

At step S530, the UE performs a random access by using the target anchor carrier or the non-anchor carrier according to a determination result.

In the above embodiments, a carrier used for performing a random access (process) may actually be considered as a carrier pair comprising a downlink carrier and a corresponding uplink carrier. It may thus be considered that the execution of a random access on a carrier as described in the present invention generally comprises: sending a preamble and/or sending a MSG3 on an uplink carrier of a carrier pair, and receiving an RAR and/or a MSG4 on a corresponding downlink carrier of the carrier pair.

In an implementation, if the switching command message comprises RACH-ConfigDedicated configuration information, then the RACH-ConfigDedicated configuration information is valid for the determined target anchor carrier or non-anchor carrier. In this case, step S530 may comprise: sending to a target base station a preamble and/or a MSG3 message on an uplink carrier associated with the determined target anchor carrier or non-anchor carrier; and receiving an RAR and/or a MSG4 message from the target base station on a downlink carrier associated with the determined target anchor carrier or non-anchor carrier.

In an implementation, the non-anchor carrier configuration information is contained in a radioresource-configdedicated information element or a physicalconfig-dedicated information element of the switching command message.

In an implementation, the switching command message is an RRC connection reconfiguration message comprising mobility control information.

Based on the foregoing implementation, optionally, the present invention may further comprise the following UE behaviors.

UE behavior 1: After a MSG3 is sent, if the UE is NB-IoT UE and is configured with a non-anchor carrier and the current random access process is triggered by a switching (RRC message), it is considered that a UL grant or a DL assignment contained in a PDCCH transmission received on an anchor carrier is valid for the non-anchor carrier.

UE behavior 2: The UE is NB-IoT UE and is configured with a non-anchor carrier; if a random access preamble is sent on an anchor carrier, the UE determines that a UL grant contained in an RAR is valid for the non-anchor carrier.

UE behavior 3: In regard to NB-IoT UE, if a switching command message (i.e., an RRC connection reconfiguration message comprising a mobility control information element) comprises a non-anchor carrier configuration (carrierConfigDedicated), the UE immediately uses the new carrier after the last transmission block carrying a subsequent RRC response message corresponding to the current RRC process is confirmed by an MAC layer. This UE behavior is directed at a situation in which the UE is configured with a non-anchor carrier in a switching command and a random access process during switching is performed on the target anchor carrier.

UE behavior 4: The UE is NB-IoT UE and is configured with a non-anchor carrier; in regard to a non-contention-based random access, if a random access preamble is sent on another non-anchor carrier supporting a random access which is different from the configured non-anchor carrier, the UE determines that a UL grant contained in an RAR is valid for the configured non-anchor carrier.

UE behavior 5: The UE is NB-IoT UE and is configured with a non-anchor carrier; in regard to a contention-based random access, if a random access preamble is sent on another non-anchor carrier supporting a random access which is different from the configured non-anchor carrier, the UE determines that a UL grant or a DL assignment contained in a PDCCH transmission received on a non-anchor carrier on which a preamble is sent or a random access is executed is valid for the configured non-anchor carrier.

The UE behaviors 4 and 5 are directed to a situation in which the UE is configured with a non-anchor carrier but the configured non-anchor carrier does not support a random access, and a random access process occurs on another non-anchor carrier supporting a random access.

In order to support a random access on a non-anchor carrier, the present invention further proposes the following embodiments.

In an embodiment, all steps of a random access process of UE are performed on the same carrier (which refers to a carrier pair herein, i.e., comprising an uplink carrier and a downlink carrier). Specifically, a carrier (pair) on which subsequent steps of the random access process are performed is the same as a carrier (pair) on which a preamble is sent. In this case, in a random access process executed on a non-anchor carrier, the UE determines that a UL grant contained in an RAR is valid for the non-anchor carrier; and the UE determines that a UL grant or a DL assignment contained in a PDCCH transmission received after a transmission of a MSG3 is valid for the non-anchor carrier.

Figure 6:
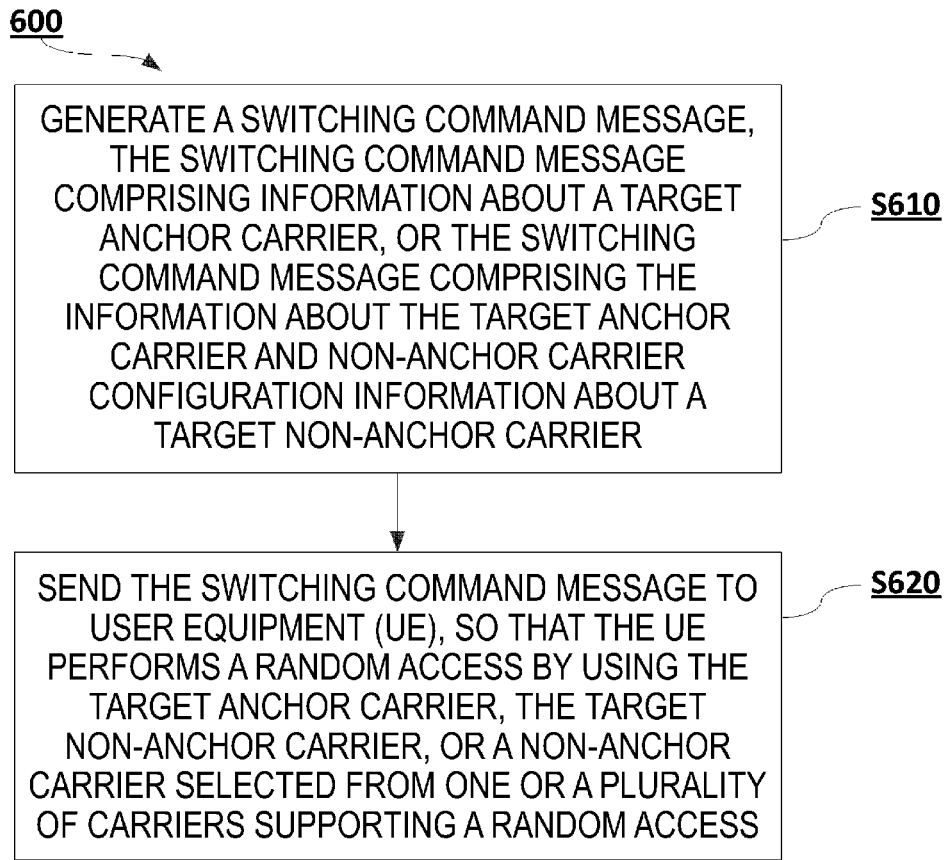
FIG. 6 schematically illustrates a flow diagram of a method 600 for a random access executed at a source base station according to an embodiment of the present invention.
Figure 7:
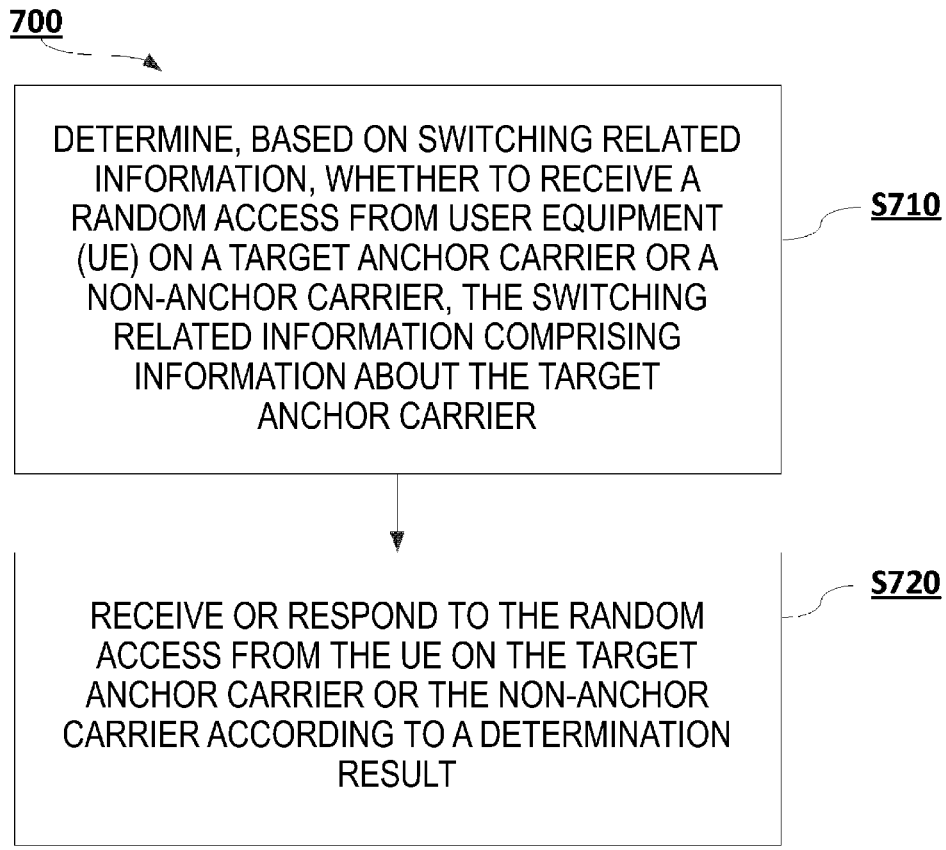
FIG. 7 schematically illustrates a flow diagram of a method 700 for a random access executed at a target base station according to an embodiment of the present invention.

A method for a random access executed at a base station according to an embodiment of the present invention will be described below with reference to FIG. 6 and FIG. 7. FIG. 6 schematically illustrates a flow diagram of a method 600 for a random access executed at a source base station according to an embodiment of the present invention. FIG. 7 schematically illustrates a flow diagram of a method 700 for a random access executed at a target base station according to an embodiment of the present invention.

As shown in FIG. 6, at step S610, a source eNB generates a switching command message. The switching command message comprises information about a target anchor carrier (i.e., information for indicating a target carrier or a target cell for a current switching) or the switching command message comprises the information about the target anchor carrier and non-anchor carrier configuration information about a target non-anchor carrier (i.e., information for configuring a non-anchor carrier (also referred to as a target non-anchor carrier) used by user equipment (UE) during or after the current switching process).

At step S620, the source eNB sends to UE the switching command message, so that the UE performs a random access by using the target anchor carrier, the target non-anchor carrier, or a non-anchor carrier selected from one or a plurality of carriers supporting a random access. The switching command message is used to instruct the UE to perform a switching operation. For example, the switching command message may be an RRC connection reconfiguration message comprising a mobility control information (mobilitycontrolinfo) information element.

In an implementation, the non-anchor carrier configuration information is contained in a radioresource-configdedicated information element or a physicalconfig-dedicated information element of the switching command message.

As shown in FIG. 7, at step S710, the source eNB determines, based on switching related information, whether to receive a random access from the UE on a target anchor carrier or a non-anchor carrier. The switching related information comprises information about the target anchor carrier.

Optionally, at step S710, the target eNB may also send, by means of dedicated signaling, for example, in a switching command, to the UE related information to be acquired for executing a random access on the target non-anchor carrier. The related information to be acquired for executing a random access on the target non-anchor carrier is, for example, non-anchor carrier configuration information, including an RACH configuration and a PRACH configuration corresponding to a non-anchor carrier. The non-anchor carrier configuration information is, for example, a non-anchor carrier frequency or index number, indication information for indicating whether a non-anchor carrier is a random access carrier, downlinkBitmapNonAnchor, dl-GapNonAnchor, and inbandCarrierinfo configurations corresponding to a non-anchor carrier, or the like.

In an implementation, step S710 may comprise: determining, if the switching related information does not comprise the non-anchor carrier configuration information about the target non-anchor carrier, to receive or respond to the random access on the target anchor carrier.

In an implementation, step S710 may comprise: determining, if the switching command message comprises the non-anchor carrier configuration information about the target non-anchor carrier and the switching related information or target cell system information does not comprise random access configuration information corresponding to the target non-anchor carrier (e.g., the random access configuration information may comprise nprach-config and/or rach-configcommon), to receive or respond to the random access on the target anchor carrier.

In an implementation, step S710 may comprise: determining, if the switching related information comprises the non-anchor carrier configuration information about the target non-anchor carrier and the target non-anchor carrier indicated by the non-anchor carrier configuration information does not support a random access, to receive or respond to the random access on the target anchor carrier.

In an implementation, step S710 may comprise: determining, if the switching related information comprises the non-anchor carrier configuration information about the target non-anchor carrier and the switching related information or the target cell system information comprises the random access configuration information corresponding to the target non-anchor carrier (e.g., the random access configuration information may comprise nprach-config and/or rach-configcommon), to receive or respond to the random access on the target non-anchor carrier.

In an implementation, step S710 may comprise: determining, if the switching command message comprises the non-anchor carrier configuration information about the target non-anchor carrier and the target non-anchor carrier indicated by the non-anchor carrier configuration information supports a random access, to receive or respond to the random access on the target non-anchor carrier.

In an implementation, step S710 may comprise: determining, if the switching command message comprises the non-anchor carrier configuration information about the target non-anchor carrier, to receive or respond to the random access on the target non-anchor carrier.

In an implementation, step S710 may comprise: receiving or responding to, if the switching related information comprises the non-anchor carrier configuration information about the target non-anchor carrier, the switching related information or the target cell system information indicates that the target anchor carrier does not support a random access, and the non-anchor carrier configuration information indicates that the target non-anchor carrier does not support a random access, the random access on a non-anchor carrier supporting a random access.

For example, if the switching related information comprises the non-anchor carrier configuration information and the switching related information or the target cell system information indicates that the target anchor carrier does not support a random access (e.g., supported by the foregoing fourth indicator), the target eNB performs the following operations:

if the target non-anchor carrier supports a random access, the target eNB receiving or responding to the random access on the target non-anchor carrier; and if the target non-anchor carrier does not support a random access, the target eNB receiving or responding to the random access on a non-anchor carrier supporting a random access.

In an implementation, step S710 may comprise: receiving or responding to, if the switching related information does not comprise the non-anchor carrier configuration information about the target non-anchor carrier and/or the switching command message or the target cell system information indicates that the target anchor carrier does not support a random access, the random access on a non-anchor carrier supporting a random access.

In an implementation, step S710 may comprise: receiving or responding to, if the switching related information comprises the non-anchor carrier configuration information about the target non-anchor carrier and the switching related information or the target cell system information does not comprise the random access configuration information corresponding to the target non-anchor carrier (e.g., the random access configuration information may comprise nprach-config and/or rach-configcommon), the random access on a non-anchor carrier supporting a random access.

In an implementation, step S710 may comprise: receiving or responding to, if the switching command message comprises the non-anchor carrier configuration information about the target non-anchor carrier and the target non-anchor carrier does not support a random access, the random access on a non-anchor carrier supporting a random access.

At step S720, the target eNB receives or responds to the random access from the UE on the target anchor carrier or the non-anchor carrier according to a determination result.

In an implementation, if the switching command message comprises RACH-ConfigDedicated configuration information, then the RACH-ConfigDedicated configuration information is valid for the determined target anchor carrier or non-anchor carrier. In this case, step S720 may comprise: receiving a preamble and/or a MSG3 message from the UE on an uplink carrier associated with the determined target anchor carrier or non-anchor carrier; and sending to the UE an RAR and/or a MSG4 message on a downlink carrier associated with the determined target anchor carrier or non-anchor carrier.

Figure 8:
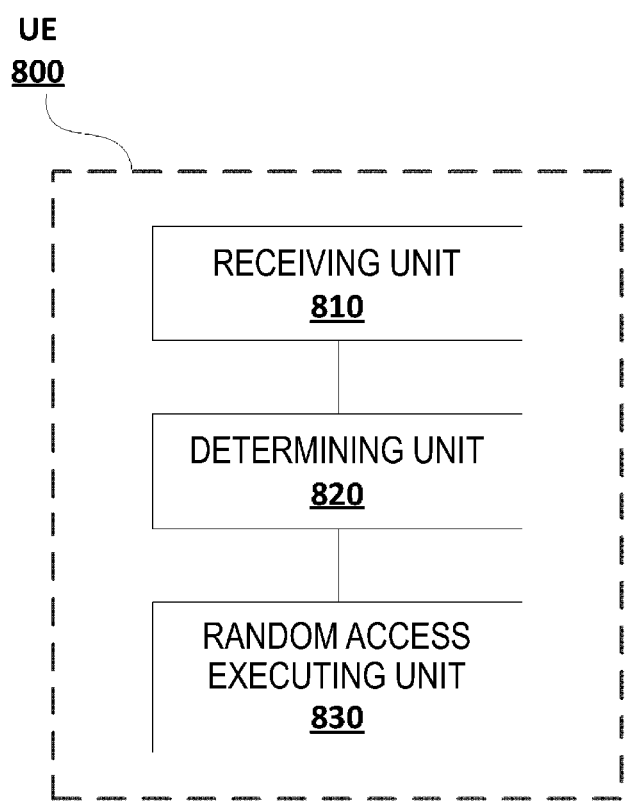
FIG. 8 schematically illustrates a structural block diagram of UE 800 according to an embodiment of the present invention.

UE according to an embodiment of the present invention will be described below with reference to FIG. 8. FIG. 8 schematically illustrates a structural block diagram of UE 800 according to an embodiment of the present invention. The UE 800 can perform the method for random access according to an embodiment of the present invention, for example, the method 500 described in detail previously as shown in FIG. 5.

As shown in FIG. 8, the UE 800 comprises a receiving unit 810, a determining unit 820, and a random access executing unit 830. Those skilled in the art should understand that only the receiving unit 810, the determining unit 820, and the random access executing unit 830 related to the present invention are shown in the UE 800 of FIG. 8 to avoid confusion of the present invention. However, those skilled in the art should understand that although not shown in FIG. 8, the UE according to the embodiment of the present invention further comprises other basic units that form the UE.

The receiving unit 810 is configured to receive a switching command message from a source base station. The switching command message comprises information about a target anchor carrier.

The determining unit 820 is configured to determine, based on the switching command message, whether to use the target anchor carrier or a non-anchor carrier to perform a random access.

The random access executing unit 830 is configured to perform a random access by using the target anchor carrier or the non-anchor carrier according to a determination result.

In an implementation, the determining unit 820 is further configured to: determine, if the switching command message does not comprise non-anchor carrier configuration information about a target non-anchor carrier, to use the target anchor carrier to perform a random access.

In an implementation, the determining unit 820 is further configured to: determine, if the switching command message comprises the non-anchor carrier configuration information about the target non-anchor carrier and the switching command message or target cell system information does not comprise the random access configuration information corresponding to the target non-anchor carrier, to use the target anchor carrier to perform random access.

In an implementation, the determining unit 820 is further configured to: determine, if the switching command message comprises the non-anchor carrier configuration information about the target non-anchor carrier and the target non-anchor carrier indicated by the non-anchor carrier configuration information does not support a random access, to use the target anchor carrier to perform a random access.

In an implementation, the determining unit 820 is further configured to: determine, if the switching command message comprises the non-anchor carrier configuration information about the target non-anchor carrier and the switching command message or the target cell system information comprises the random access configuration information corresponding to the target non-anchor carrier, to use the target non-anchor carrier to perform a random access.

In an implementation, the determining unit 820 is further configured to: determine, if the switching command message comprises the non-anchor carrier configuration information about the target non-anchor carrier and the target non-anchor carrier indicated by the non-anchor carrier configuration information supports a random access, to use the target non-anchor carrier to perform a random access.

In an implementation, the determining unit 820 is further configured to: determine, if the switching command message comprises the non-anchor carrier configuration information about the target non-anchor carrier, to use the target non-anchor carrier to perform a random access.

In an implementation, the determining unit 820 is further configured to: select, if the switching command message comprises the non-anchor carrier configuration information about the target non-anchor carrier, the switching command message or the target cell system information indicates that the target anchor carrier does not support a random access, and the non-anchor carrier configuration information indicates that the target non-anchor carrier does not support a random access, a non-anchor carrier from one or a plurality of carriers supporting a random access to perform a random access.

In an implementation, the determining unit 820 is further configured to: select, if the switching command message does not comprise the non-anchor carrier configuration information about the target non-anchor carrier and/or the switching command message or the target cell system information indicates that the target anchor carrier does not support a random access, a non-anchor carrier from one or a plurality of carriers supporting a random access to perform a random access.

In an implementation, the determining unit 820 is further configured to: select, if the switching command message comprises the non-anchor carrier configuration information about the target non-anchor carrier, the switching command message or the target cell system information does not comprise the random access configuration message corresponding to the target non-anchor carrier, a non-anchor carrier from one or a plurality of carriers supporting a random access to perform a random access.

In an implementation, the determining unit 820 is further configured to: select, if the switching command message comprises the non-anchor carrier configuration information about the target non-anchor carrier and the target non-anchor carrier does not support a random access, a non-anchor carrier from one or a plurality of carriers supporting a random access to perform a random access.

In an implementation, the non-anchor carrier configuration information is contained in a radioresource-configdedicated information element or a physicalconfig-dedicated information element of the switching command message.

In an implementation, the switching command message is an RRC connection reconfiguration message comprising mobility control information.

In an implementation, if the switching command message comprises RACH-ConfigDedicated configuration information, then the RACH-ConfigDedicated configuration information is valid for the determined target anchor carrier or non-anchor carrier. In this case, the random access executing unit 830 is further configured to: send to the target base station a preamble and/or a MSG3 message on an uplink carrier associated with the determined target anchor carrier or non-anchor carrier; and receive an RAR and/or a MSG4 message from the target base station on a downlink carrier associated with the determined target anchor carrier or non-anchor carrier.

Figure 9:
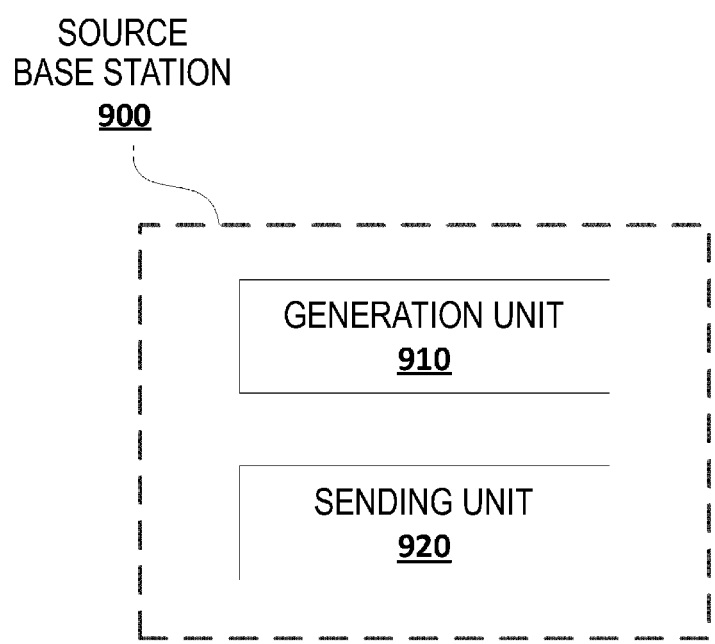
FIG. 9 schematically illustrates a structural block diagram of a source base station 900 according to an embodiment of the present invention.

A base station according to an embodiment of the present invention will be described below with reference to FIG. 9. FIG. 9 schematically illustrates a structural block diagram of a source base station 900 according to an embodiment of the present invention. The source base station 900 can perform the method for a random access according to an embodiment of the present invention, for example, the method 600 described in detail previously as shown in FIG. 6.

As shown in FIG. 9, the source base station 900 comprises a generation unit 910 and a sending unit 920. Those skilled in the art should understand that only the generation unit 910 and the sending unit 920 related to the present invention are shown in the source base station 900 of FIG. 9 to avoid confusion of the present invention. However, those skilled in the art should understand that although not shown in FIG. 9, the base station according to the embodiment of the present invention further comprises other basic units that form the base station.

The generation unit 910 is configured to generate a switching command message. The switching command message comprises information about a target anchor carrier, or the switching command message comprises the information about the target anchor carrier and non-anchor carrier configuration information about a target non-anchor carrier.

The sending unit 920 is configured to send to user equipment (UE) the switching command message, so that the UE performs a random access by using the target anchor carrier, the target non-anchor carrier, or a non-anchor carrier selected from one or a plurality of carriers supporting a random access In an implementation, the non-anchor carrier configuration information is contained in a radioresource-configdedicated information element or a physicalconfig-dedicated information element of the switching command message.

In an implementation, the switching command message is an RRC connection reconfiguration message comprising mobility control information.

Figure 10:
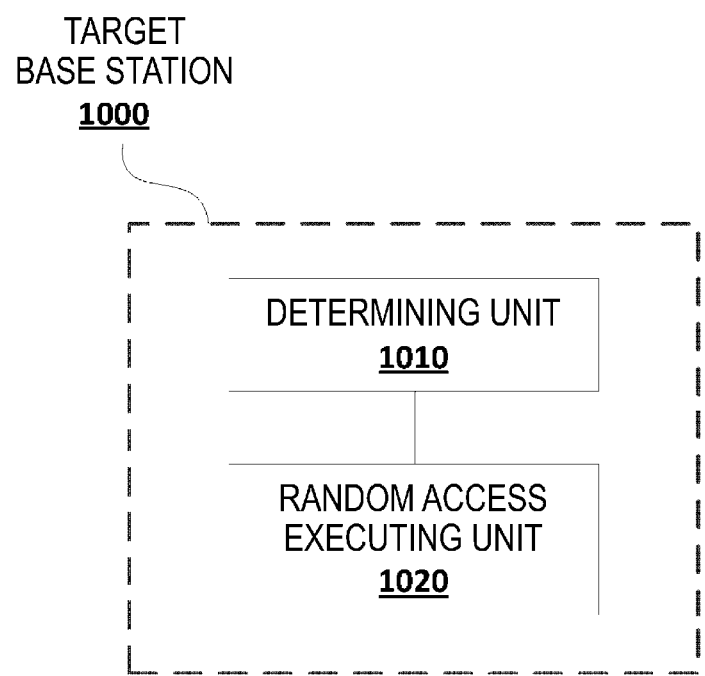
FIG. 10 schematically illustrates a structural block diagram of a target base station 1000 according to an embodiment of the present invention.

A base station according to an embodiment of the present invention will be described below with reference to FIG. 10. FIG. 10 schematically illustrates a structural block diagram of a target base station 1000 according to an embodiment of the present invention. The target base station 1000 can perform the method for a random access according to an embodiment of the present invention, for example, the method 700 described in detail previously as shown in FIG. 7.

As shown in FIG. 10, the target base station 1000 comprises a determining unit 1010 and a random access executing unit 1020. Those skilled in the art should understand that only the determining unit 1010 and the random access executing unit 1020 related to the present invention are shown in the target base station 1000 of FIG. 10 to avoid confusion of the present invention. However, those skilled in the art should understand that although not shown in FIG. 10, the base station according to the embodiment of the present invention further comprises other basic units that form the base station.

The determining unit 1010 is configured to determine, based on switching related information, whether to receive a random access from user equipment (UE) on a target anchor carrier or a non-anchor carrier. The switching related information comprises information about the target anchor carrier.

The random access executing unit 1020 is configured to receive or responding to the random access from the UE on the target anchor carrier or the non-anchor carrier according to a determination result.

In an implementation, the determining unit 1010 is further configured to: determine, if the switching related information does not comprise non-anchor carrier configuration information about a target non-anchor carrier, to receive or respond to the random access on the target anchor carrier.

In an implementation, the determining unit 1010 is further configured to: determine, if a switching command message comprises the non-anchor carrier configuration information about the target non-anchor carrier and the switching related information or target cell system information does not comprise random access configuration information corresponding to the target non-anchor carrier, to receive or respond to the random access on the target anchor carrier.

In an implementation, the determining unit 1010 is further configured to: determine, if the switching related information comprises the non-anchor carrier configuration information about the target non-anchor carrier and the target non-anchor carrier indicated by the non-anchor carrier configuration information does not support a random access, to receive or respond to the random access on the target anchor carrier.

In an implementation, the determining unit 1010 is further configured to: determine, if the switching related information comprises the non-anchor carrier configuration information about the target non-anchor carrier and the switching related information or the target cell system information comprises the random access configuration information corresponding to the target non-anchor carrier, to receive or respond to the random access on the target non-anchor carrier.

In an implementation, the determining unit 1010 is further configured to: determine, if the switching command message comprises the non-anchor carrier configuration information about the target non-anchor carrier and the target non-anchor carrier indicated by the non-anchor carrier configuration information supports a random access, to receive or respond to the random access on the target non-anchor carrier.

In an implementation, the determining unit 1010 is further configured to: determine, if the switching command message comprises the non-anchor carrier configuration information about the target non-anchor carrier, to receive or respond to the random access on the target non-anchor carrier.

In an implementation, the determining unit 1010 is further configured to: receive or respond to, if the switching related information comprises the non-anchor carrier configuration information about the target non-anchor carrier, the switching related information or the target cell system information indicates that the target anchor carrier does not support a random access, and the non-anchor carrier configuration information indicates that the target non-anchor carrier does not support a random access, the random access on a non-anchor carrier supporting a random access.

In an implementation, the determining unit 1010 is further configured to: receive or respond to, if the switching related information does not comprise the non-anchor carrier configuration information about the target non-anchor carrier and/or the switching command message or the target cell system information indicates that the target anchor carrier does not support a random access, the random access on a non-anchor carrier supporting a random access.

In an implementation, the determining unit 1010 is further configured to: receive or respond to, if the switching related information comprises the non-anchor carrier configuration information about the target non-anchor carrier and the switching related information or the target cell system information does not comprise the random access configuration information corresponding to the target non-anchor carrier, the random access on a non-anchor carrier supporting a random access.

In an implementation, the determining unit 1010 is further configured to: receive or respond to, if the switching command message comprises the non-anchor carrier configuration information about the target non-anchor carrier and the target non-anchor carrier does not support a random access, the random access on a non-anchor carrier supporting a random access.

In an implementation, if the switching command message comprises RACH-ConfigDedicated configuration information, then the RACH-ConfigDedicated configuration information is valid for the determined target anchor carrier or non-anchor carrier. In this case, the random access executing unit 1020 is further configured to: receive a preamble and/or a MSG3 message from the UE on an uplink carrier associated with the determined target anchor carrier or non-anchor carrier; and send to the UE an RAR and/or a MSG4 message on a downlink carrier associated with the determined target anchor carrier or non-anchor carrier.

The specific implementations of the present invention are disclosed in detail above with reference to the accompanying drawings; and the manners in which the principle of the present invention is employed are illustrated. It should be understood that the embodiments of the present invention are not limited in scope. Within the spirit and scope defined by the appended claims, the embodiments of the present invention may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention can be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A User Equipment (UE) comprising:
receiving circuitry configured to receive a broadcast system information block (SIB) containing a configuration used for random access, the configuration indicating an uplink non-anchor carrier;
transmitting circuitry configured to transmit a preamble on the uplink non-anchor carrier on the basis of the configuration; and
processing circuitry configured to determine, on the basis of whether the configuration is a first configuration or a second configuration, whether to use a downlink anchor carrier in order to receive a random access response (RAR), the first configuration indicating a downlink non-anchor carrier that is associated with the uplink non-anchor carrier and is used for random access, and the second configuration not indicating a downlink non-anchor carrier that is associated with the uplink non-anchor carrier and is used for random access,
wherein:
the receiving circuitry is further configured to receive the RAR, such that
if it is determined that the configuration is the first configuration, the RAR is received on the downlink non-anchor carrier,
otherwise, the RAR is received on the downlink anchor carrier,
the downlink non-anchor carrier is a carrier where the UE does not acquire a primary synchronization signal for Narrowband-Internet of Things (NB-IoT), a secondary synchronization signal for the NB-IoT, a physical broadcast channel for the NB-IoT, and a system information block for the NB-IoT, and
the downlink anchor carrier is a carrier where the UE acquires the primary synchronization signal for the NB-IoT, the secondary synchronization signal for the NB-IoT, the physical broadcast channel for the NB-IoT, and the system information block for the NB-IoT.

2. A base station which communicates with a User Equipment (UE), comprising:
transmitting circuitry configured to broadcast a system information block (SIB) containing a configuration used for random access, the configuration indicating an uplink non-anchor carrier; and
receiving circuitry configured to receive a preamble on the uplink non-anchor carrier on the basis of the configuration, the configuration being a configuration used for causing the UE to determine, on the basis of whether the configuration is a first configuration or a second configuration, whether to use a downlink anchor carrier in order to receive a random access response (RAR), the first configuration indicating a downlink non-anchor carrier that is associated with the uplink non-anchor carrier and is used for random access, and the second configuration not indicating a downlink non-anchor carrier that is associated with the uplink non-anchor carrier and is used for random access,
wherein:
the transmitting circuitry is further configured to transmit the RAR, such that
if the configuration is the first configuration, the RAR is transmitted on the downlink non-anchor carrier,
otherwise, the RAR is transmitted on the downlink anchor carrier,
the downlink non-anchor carrier is a carrier where the UE does not acquire a primary synchronization signal for Narrowband-Internet of Things (NB-IoT), a secondary synchronization signal for the NB-IoT, a physical broadcast channel for the NB-IoT, and a system information block for the NB-IoT, and
the downlink anchor carrier is a carrier where the UE acquires the primary synchronization signal for the NB-IoT, the secondary synchronization signal for the NB-IoT, the physical broadcast channel for the NB-IoT, and the system information block for the NB-IoT.

3. A method performed by a User Equipment (UE) comprising:
receiving a broadcast system information block (SIB) containing a configuration used for random access, the configuration indicating an uplink non-anchor carrier;
transmitting a preamble on the uplink non-anchor carrier on the basis of the configuration;
determining, on the basis of whether the configuration is a first configuration or a second configuration, whether to use a downlink anchor carrier in order to receive a random access response (RAR), the first configuration indicating a downlink non-anchor carrier that is associated with the uplink non-anchor carrier and is used for random access, and the second configuration not indicating a downlink non-anchor carrier that is associated with the uplink non-anchor carrier and is used for random access; and
receiving the RAR, such that
if it is determined that the configuration is the first configuration, the RAR is received on the downlink non-anchor carrier,
otherwise, the RAR is received on the downlink anchor carrier,
wherein:
the downlink non-anchor carrier is a carrier where the UE does not acquire a primary synchronization signal for Narrowband-Internet of Things (NB-IoT), a secondary synchronization signal for the NB-IoT, a physical broadcast channel for the NB-IoT, and a system information block for the NB-IoT, and
the downlink anchor carrier is a carrier where the UE acquires the primary synchronization signal for the NB-IoT, the secondary synchronization signal for the NB-IoT, the physical broadcast channel for the NB-IoT, and the system information block for the NB-IoT.

4. A method performed by a base station which communicates with a User Equipment (UE), comprising:
broadcasting a system information block (SIB) containing a configuration used for random access, the configuration indicating an uplink non-anchor carrier;
receiving a preamble on the uplink non-anchor carrier on the basis of the configuration, the configuration being a configuration used for causing the UE to determine, on the basis of whether the configuration is a first configuration or a second configuration, whether to use a downlink anchor carrier in order to receive a random access response (RAR), the first configuration indicating a downlink non-anchor carrier that is associated with the uplink non-anchor carrier and is used for random access, and the second configuration not indicating a downlink non-anchor carrier that is associated with the uplink non-anchor carrier and is used for random access;
transmitting the RAR, such that
if the configuration is the first configuration, the RAR is transmitted on the downlink non-anchor carrier,
otherwise, the RAR is transmitted on the downlink anchor carrier,
wherein:
the downlink non-anchor carrier is a carrier where the UE does not acquire a primary synchronization signal for Narrowband-Internet of Things (NB-IoT), a secondary synchronization signal for the NB-IoT, a physical broadcast channel for the NB-IoT, and a system information block for the NB-IoT, and
the downlink anchor carrier is a carrier where the UE acquires the primary synchronization signal for the NB-IoT, the secondary synchronization signal for the NB-IoT, the physical broadcast channel for the NB-IoT, and the system information block for the NB-IoT.

* * * * *